(12) United States Patent
Balkus, Jr. et al.

(10) Patent No.: US 12,600,633 B2
(45) Date of Patent: Apr. 14, 2026

(54) NANOSTRUCTURED CARBONS AND METHODS OF PREPARING THE SAME

(71) Applicant: Board of Regents, the University of Texas System, Austin, TX (US)

(72) Inventors: Kenneth J. Balkus, Jr., The Colony, TX (US); Alexander T. Brown, Colorado Springs, CA (US)

(73) Assignee: Board of Regents, the University of Texas System, Austin, TX (US)

( * ) Notice: Subject to any disclaimer, the term of this patent is extended or adjusted under 35 U.S.C. 154(b) by 958 days.

(21) Appl. No.: 17/018,316

(22) Filed: Sep. 11, 2020

(65) Prior Publication Data

US 2021/0087063 A1 Mar. 25, 2021

Related U.S. Application Data

(60) Provisional application No. 62/899,122, filed on Sep. 11, 2019.

(51) Int. Cl.
| | |
|---|---|
| *C01B 32/186* | (2017.01) |
| *B01J 23/02* | (2006.01) |
| *B01J 23/10* | (2006.01) |
| *C01B 32/154* | (2017.01) |
| *C01B 32/162* | (2017.01) |
| *C01B 32/18* | (2017.01) |

(52) U.S. Cl.
CPC ............. *C01B 32/186* (2017.08); *B01J 23/02* (2013.01); *B01J 23/10* (2013.01); *C01B 32/154* (2017.08); *C01B 32/162* (2017.08); *C01B 32/18* (2017.08); *C01B 2202/22* (2013.01); *C01B 2202/32* (2013.01); *C01B 2204/22* (2013.01); *C01B 2204/32* (2013.01); *C01P 2002/72* (2013.01); *C01P 2002/82* (2013.01); *C01P 2002/85* (2013.01); *C01P 2004/03* (2013.01); *C01P 2004/04* (2013.01)

(58) Field of Classification Search
CPC .................................................. C01B 32/186
See application file for complete search history.

(56) References Cited

PUBLICATIONS

Couteau et al., CVD synthesis of high-purity multiwalled carbon nanotubes using CaCO3 catlyst support large-scale production, 2003, Chemical Physics Letters, 378, pp. 9-17 (Year: 2003).*
Cullinan et al., Control of Carbon Nanotubes Stiffness via Tunable Fabrication Process Parameters that Determine CNT Geometry, 2008, MIT, pp. 1-126 (Year: 2008).*
Ibrahim et al., Carbon Nanotube-Quicklime Nanocomposites Prepared Using a Nickel Catalyst Supported on Calcium Oxide Derived from Carbonate Stones, Aug. 31, 2019, Nanomaterials, 9, 1239, pp. 1-17 (Year: 2019).*
Rummeli et al., Synthesis of carbon nanotubes with and without catalyst particles, Nanoscale Research Letters, 2011, 6:303, pp. 1-9 (Year: 2011).*
Silvy et al. Multi-walled Carbon Nanotubes: Manufacturing, Characterization and Applications, Southwest NanoTechnologies, 2013, pp. 1-12 (Year: 2013).*

(Continued)

*Primary Examiner* — Andrew J Bowman
(74) *Attorney, Agent, or Firm* — THOMAS | HORSTEMEYER, LLP

(57) ABSTRACT

The inventive concept described herein relates to nanostructured carbons having improved characteristics, and method of preparing the same.

9 Claims, 28 Drawing Sheets

(56)  References Cited

PUBLICATIONS

Zahid et al., Synthesis of carbon nanomaterials from different pyrolysis techniques: a review, Materials Research Express 5, 2018, pp. 1-11 (Year: 2018).*

Brown et al., Nanocast carbon microsphere flower from a lanthanum-based template, Materials Letters 234, pp. 224-227 (Year: 2019).*

* cited by examiner

Lanthanum Microsphere Preparation

Carbon Microsphere Preparation

600

Calcium

800

Place calcium source in tube furnace under constant nitrogen flow — 802

Heat to prescribed temperature and time — 804

Turn on acetylene and water vapor for allotted time, then turn off both — 806

Increase temperature to 900°C and anneal for 2 hours — 808

Turn off furnace and remove product — 810

Rinse sample with water — 812

Dry Sample at 100 °C — 814

A

B

A

B

C

D

A

B

C

A

B

C

A

B

C

D

E

A

| Scan Rates (mV/sec) | Specific Capacitance (F/g) |
|---|---|
| 10 | 118.6 |
| 25 | 114.0 |
| 50 | 108.4 |
| 75 | 104.0 |
| 100 | 99.6 |

B

| Energy Density (Wh/kg) | Power Density (W/kg) |
|---|---|
| 55.7 | 1714.7 |
| 52.7 | 3356.9 |
| 49.9 | 4983.8 |
| 46.7 | 6530.2 |
| 43.5 | 8030.3 |
| 39.0 | 9188.6 |
| 37.1 | 10822.9 |
| 34.1 | 12142.6 |
| 30.5 | 13094.1 |
| 27.5 | 14073.6 |

C

Magnesium

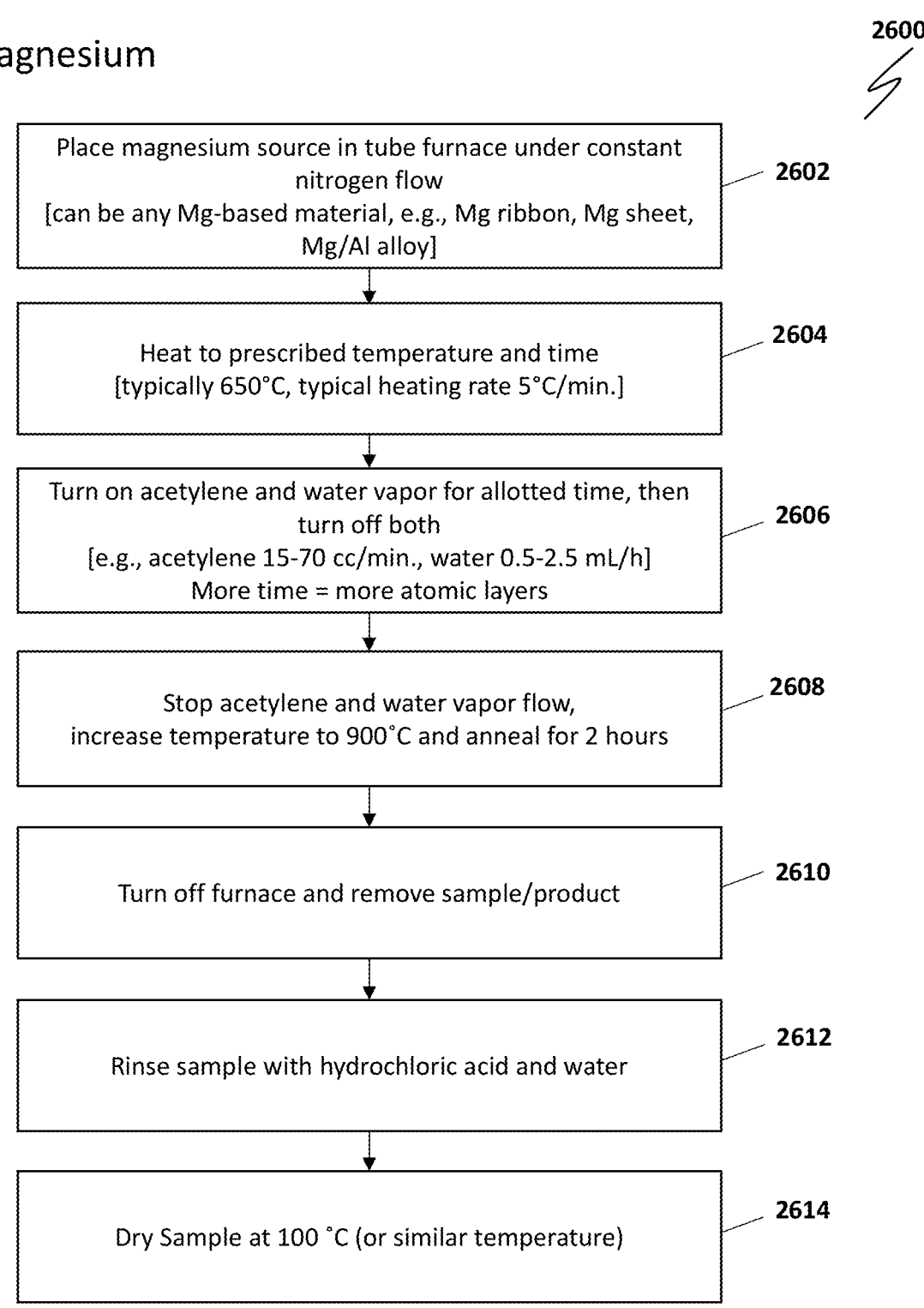

Place magnesium source in tube furnace under constant nitrogen flow
[can be any Mg-based material, e.g., Mg ribbon, Mg sheet, Mg/Al alloy]　2602

Heat to prescribed temperature and time
[typically 650°C, typical heating rate 5°C/min.]　2604

Turn on acetylene and water vapor for allotted time, then turn off both
[e.g., acetylene 15-70 cc/min., water 0.5-2.5 mL/h]
More time = more atomic layers　2606

Stop acetylene and water vapor flow,
increase temperature to 900°C and anneal for 2 hours　2608

Turn off furnace and remove sample/product　2610

Rinse sample with hydrochloric acid and water　2612

Dry Sample at 100 °C (or similar temperature)　2614

NANOSTRUCTURED CARBONS AND METHODS OF PREPARING THE SAME

CROSS REFERENCE TO RELATED APPLICATION

This application claims the benefit of U.S. Provisional Application Ser. No. 63/019,714, filed Sep. 11, 2019, the entirety of each of which is incorporated herein by reference.

FIELD OF THE INVENTION

The inventive concept relates to improved methods of preparing nanostructured carbons using catalysts, including calcium, lanthanum and/or magnesium, that also serve as the template/support for carbon growth.

BACKGROUND

Porous and nanostructured carbons are commonly used as catalyst supports, adsorbents, and energy storage materials. Micro- and nanostructured carbons, including graphene and graphitic carbons, can be derived using variety of methods like polymer degradation, polysaccharides pyrolysis, and combustion of gases during chemical vapor deposition (CVD). Recently, a CVD method for the low temperature production of well-formed graphene-like carbon microstructures has been developed by Ryoo et al. Other structures, such as wrinkled silica nanoparticles were impregnated with lanthanum and used to nanocast carbon. Previously, cerium and lanthanum flower microsphere have been synthesized from polysaccharide-based graft copolymers.

The potential uses of graphene are broad and can be applied to many fields including energy storage, illumination, bioimaging, sensors, electronics, conductive inks, and various consumer products. Graphene has also been used in photovoltaics, catalyst supports, adsorbents, sensors, consumer products, coatings, additives, lubricants, electronics and much more. For example, some automakers have reported production of car parts from graphene-polyurethane foam and is purchasing graphene at a cost of ~$64,000/ton of graphene. Graphene can also greatly enhance the mechanical strength of concrete. Graphene is also commonly used as an energy storage material in the lithium ion batteries, fuel cells, and supercapacitors.

Currently there is a need for graphene-like carbons that have a regular porous structure, high surface areas, and high electrical conductivities. Some specialty carbons such as Kenjenblack and Vulcan XC72 are used because of the high surface area and high electrical conductivity properties. One of the highest surface area carbons that is also electrically conductive is monolayer graphene; although production is too expensive for widespread use.

Specifically, a critical need for power regulation of electrical grids has led to the development of improved electric double layered capacitors (EDLC). EDLCs are ideal for power regulation due to their high cycle life and rapid charge/discharge. The widespread commercialization of EDLC supercapacitors requires innovative materials comprised of high surface area carbons with low electrical resistivity. Recently, Samsung commercialized a $SiO_2$ templated graphene ball for a lithium-ion battery that has five times faster charging speed[7]. In another study, an EDLC was assembled using graphene and an ionic liquid resulting in a high energy density of 85.6 Wh/kg. The current commercial supercapacitor market is largely based on activated carbon materials with organic electrolytes that have energy densities of ~5 Wh/kg.

In 2003, the first example of calcium-derived carbon synthesis has been previously reported, where pulsed laser deposition was used to inject calcium hydroxide and methane into a plasma to deposit carbon on $Ti_6Al_4V$. Diamond-like carbon was coated on the titanium material as a biocompatible coating for application for bone screw impacts. In 2012, molten Mg was coated on $CaCO_3$ at 850° C. and the $CaCO_3$ was used as a carbon source for Mg to react and form MgO/carbon. Recently, a $CaCO_3$ crystal was converted to CaO monolith and a $H_2/CH_4$ mixture was used to deposit carbon at high temperature (1050° C.). Calcium substituted zeolites (CaY) were used as a template to generate graphitic carbons. The reaction condition has $C_2H_2$ at 650° C. for 5 h and after extraction of the zeolite with HF/HCl, a schwarzite graphene-like structure was produced. The carbons were found to be highly electrically conductive and $^{13}C$ solid state NMR detected only $sp^2$-hybridized carbons. Also, $CaCO_3$ eggshells were used a template for the ethanol reforming into graphene-like carbons at low pressure (<0.1 Ton). Other gases such as ethylene, carbon monoxide, methane and water were attempted for carbon growth, but without success. Most importantly, inspired by a 1969 study of $CaC_2$ reactions, a minute amount of graphene was synthesized by the addition of water to $CaC_2$ at room temperature.

As such, there remains a need for improved methods of preparing nanostructured carbons, as well as methods of preparing of nanostructured carbons at lower cost and with improved physical characteristics.

SUMMARY

Described herein are methods for the generation of graphitic and nanostructured carbons. The carbon structure may be synthesized by methods using a catalyst that also serves as a template/support for growing the carbon structure, water, and acetylene. A variety of carbon morphologies may be prepared via a variety of reaction conditions. For example, in aspects of the inventive concept, a crumpled carbon structure made by the novel method limits the restacking of graphitic carbon layers, while maintaining the electrical, transport, and the physical properties similar to commercial graphene. The development of inexpensive techniques to synthesize graphene materials is a critical need for various applications.

Aspects of the inventive concept include using lanthanum carbonate nanostructures as nanocasting templates and for the catalytic formation of graphitic and nanostructured carbon. Carbons with a 3D pore structures are first derived from a lanthanum-ion initiated acrylamide-glucose graft copolymer. Additional graphitic carbon was then nanocast from acetylene, utilizing the catalytic properties of a lanthanum-based template.

Other aspects of the inventive concept include using calcium hydroxide, calcium carbonate, and/or calcium oxide as a catalyst and template, benefits of which include that it is inexpensive, environmentally safe, and it is easily removed from carbon using water, for the catalytic preparation of graphitic and nanostructured carbon. Advantageous aspects of using calcium-based catalysts, including reusability, recovery, recyclability, and scalability, are described herein.

Other aspects of the inventive concept include using magnesium ribbon, a magnesium/aluminum alloy, and/or magnesium foil as a catalyst and template for the growth of continuous and conductive carbon sheets which may be used, for example, in preparing long carbon fiber wires.

According to an aspect of the inventive concept, provided is a method of preparing a nanocarbon material including: heating a catalyst and template to a first temperature; exposing the catalyst and template to a carbon source at the first temperature for a first period of time; annealing the catalyst, template, and carbon derived from the carbon source at a second temperature for a second period of time; and removing the catalyst and template to provide a nanocarbon material having an electrical conductivity greater than about $10^3$ S/m and a surface area greater than about 500 m$^2$/g.

According to another aspect of the inventive concept provided is a nanocarbon material having an electrical conductivity greater than about $10^3$ S/m and a surface area greater than about 500 m$^2$/g. The nanocarbon material may include, but is not limited to, microspheres, graphene sheets, crumpled carbon or crumpled graphene layers, hollow nanospheres, nanotubes, continuous conductive carbon sheets, long carbon fiber wires, and the like.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 2A-2F is a set of SEM/TEM images of: (FIG. 2A) LaCO$_3$OH/La$_2$CO$_3$O$_2$ microspheres; (FIG. 2B) LaCO$_3$OH/La$_2$CO$_3$O$_2$ microspheres inset of La$_2$CO$_3$O$_2$ (0 2 2) lattice fringes; (FIG. 2C) La(OH)$_3$ microsphere post-CVD shows the hollow core; (FIGS. 2D and 2E) carbon microsphere morphology; and (FIG. 2F) close-up image of disordered carbon pores.

(FIG. 3A) Powder X-ray diffraction patterns of the lanthanum-based microspheres with carbon (top), lanthanum-based microspheres as synthesized (bottom); (FIG. 3B) Raman spectrum of the carbon microsphere flowers; (FIG. 3C) Carbon microsphere flower multipoint BET inset with the QSDFT pore diameter; and (FIG. 3D) Carbon 1 s XPS spectrum.

FIGS. 9A-9H is a set of images showing the TEM and SEM images of: (FIGS. 9A, 9B) crumpled carbon; (FIGS.

9C, 9D) graphene fiber; (FIGS. 9E, 9F) hollow nanospheres, (FIG. 9G) cup-stack carbon tubes; and (FIG. 9H) carbon nanotubes.

(FIG. 10A) the nitrogen adsorption/desorption isotherm; and (FIG. 10B) the pore size distribution for crumpled carbon.

(FIG. 12A) the cyclic voltammetry (CV) from −2 to 2 V; and (FIG. 12B) galvanostatic charge-discharge curves (CDC) from 1-10 A/g for crumpled carbon.

(FIG. 14A) SEM images of carbon on calcium before removing calcium; (FIG. 14B) a graph showing the PXRD of carbon on the CaO/Ca(OH)$_2$ catalyst; and (FIG. 14C) TEM images of crumpled carbon with 2-5 carbon layers after CaO/Ca(OH)$_2$ extraction.

(FIG. 15A) a TEM image; (FIG. 15B) an SEM image; (FIG. 15C) lattice fringes; (FIG. 15D) selected-area electron diffraction; (FIG. 15E) a nitrogen adsorption/desorption isotherm; and (FIG. 15F) pore size distribution of the multi-layer crumpled carbon.

(FIGS. 16A and 16B) TEM images of the graphene fiber/crumpled carbon mixture, as well as unraveling graphene fibers; (FIG. 16C) the SEM elemental analysis; and (FIG. 16D) the Raman spectrum.

FIG. 17A shows a TEM image of hollow carbon nano-spheres with few layers synthesized from nanoparticle calcium oxide for a short reaction time. Many of the nanospheres have an open end indicating how calcium oxide can be removed from the core. FIG. 17B shows the nitrogen adsorption/desorption isotherm. FIG. 17C is shows the pore size distribution.

(FIG. 18A) TEM; (FIG. 18B) SEM; (FIG. 18C) TEM image of the carbon (002) lattice fringes; (FIG. 18D) nitrogen adsorption/desorption isotherm; and (FIG. 18F) pore size distribution of the multi-layer hollow nano-spheres.

(FIG. 20A) a TEM image; (FIG. 20B) a nitrogen adsorption/desorption isotherm, (FIG. 20C) pore size distribution of few-layered crumpled carbon.

(FIG. 21A) an SEM image; (FIG. 21B) a TEM image; (FIG. 21C) an SEM elemental analysis: (FIG. 21D) a C-1s XPS spectrum; and (FIG. 21E) an S-2p XPS spectrum of H$_2$S-catalyzed crumpled carbon.

(FIG. 25A) the CV results of specific capacitance as different scan rates; (FIG. 25B) the energy and power densities from 1-10 A/g; and (FIG. 25C) a Ragone plot of the energy and power densities.

FIG. 26 is a flow chart of synthesis method for producing continuous conductive carbon sheets according to embodiments of the present inventive concept.

DETAILED DESCRIPTION

Figure 1:
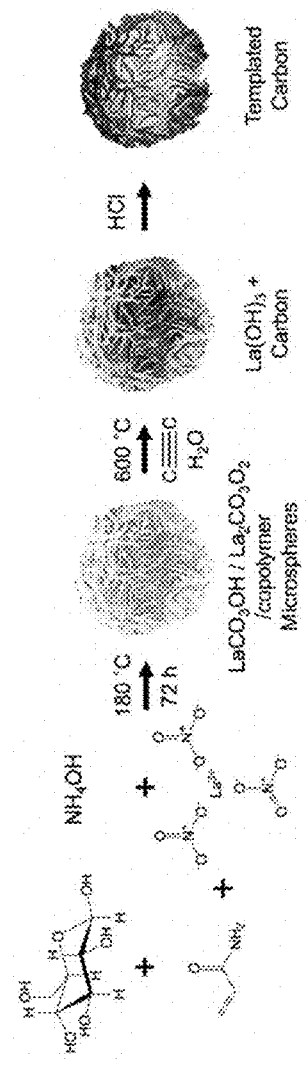
FIG. 1 is a cartoon diagram depicting the synthesis of carbon microspheres from a lanthanum carbonate template according to an embodiment of the present inventive concept.

It is contemplated that any method or composition described herein can be implemented with respect to any other method or composition described herein. Other objects, features and advantages of the present disclosure will become apparent from the following detailed description. It should be understood, however, that the detailed description and the specific examples, while indicating specific embodiments of the disclosure, are given by way of illustration only, since various changes and modifications within the spirit and scope of the disclosure will become apparent to those skilled in the art from this detailed description.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, numbers, steps, operations, elements, components, or a combination thereof, but do not preclude the presence or addition of one or more other features, numbers, steps, operations, elements, components, or a combination thereof. As used herein, the term "and/or" includes any and all combinations of one or more of the associated listed items. Further, according to embodiments of the present inventive concept, the present inventive concept may comprise, "consist essentially of" or "consist of" the elements described herein.

Unless otherwise defined, all terms used herein, including technical and scientific terms, have the same meaning as commonly understood by one of ordinary skill in the art to which the inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to some embodiments of the inventive concept, provided are methods for the synthesis of graphene-like carbons at temperatures ~50% lower than commercial electrically conductive carbons is proposed. In the present work, we also discuss the significance of the relationship between electrical conductivity and the C-1s XPS $\pi$-$\pi$* plasmon loss peak. Graphitic materials with high electrical conductivity and high surface area properties can be realized through the novel method and used in devices such as supercapacitors. For example, an electric double layer capacitor (EDLC) device using crumpled carbon prepared by methods according to embodiments of the present inventive concept was assembled and the electrochemical properties measured thereof.

According to embodiments of the present inventive concept, provided are carbons and carbon products, such as graphitic and/or nanostructured carbons, and novel and improved methods of preparing, for example, graphitic and/or nanostructured carbons. It will be appreciated that graphitic and nanostructured carbons of the inventive concept prepared by methods of the present inventive concept are not particularly limited, and may include any graphitic and/or nanostructured carbons that may be appreciated by one of skill in the art. These carbons and carbon products may be two-dimensional or three-dimensional, combinations of two-dimensional, combinations of three-dimensional, and/or combinations of two- and three-dimensional carbons. In some embodiments, the carbons and structures thereof may include, but are not limited to sheets, such as graphene sheets, nanotubes, nanospheres, and the like. In some embodiments, the carbons of the inventive concept, and carbons prepared by methods of the present inventive concept, may include structures such as graphene layers, graphene fibers formed from and/or including, for example, about 2-3 graphene layers, and crumpled carbon sheets.

It will also be appreciated that graphitic and/or nanostructured carbons of the inventive concept may include products with improved physical characteristics over products in the prior art, and graphitic and/or nanostructured carbons prepared by methods of the inventive concept may provide products with improved physical characteristics over products in the prior art. Examples of carbon nanotube fibers and reduced graphene oxide fibers in the prior art exhibit electrical conductivities of up to (i.e., less than or equal to about) $10^3$ S/m and up to $10^2$ S/m, respectively. Characteristics of carbon products of the present inventive concept, in some embodiments, may have electrical conductivities greater than about $10^3$ S/m, greater than about $2\times10^3$ S/m, greater than about $5\times10^3$ S/m, greater than about $10^4$ S/m, greater than about $5\times10^4$ S/m, or even greater than about $10^5$ S/m, up to the theoretical maximum for the electrical conductivity of the material.

In some embodiments, carbon products of the present inventive concept, and carbon products prepared by methods of the inventive concept, may have a surface area of greater than about 500 m$^2$/g, greater than about 600 m$^2$/g, greater than about 700 m$^2$/g, greater than about 800 m$^2$/g, greater than about 1,000 m$^2$/g, greater than about 1,200 m$^2$/g, or for example, may have a surface area in a range of about 500-1,300 m$^2$/g, but is not limited thereto. In some embodiments, carbon products of the present inventive concept, and carbon products prepared by methods of the inventive concept, may have a pore size of less than about 15 nm but is not limited thereto. In some embodiments, carbon products of the present inventive concept, and carbon products prepared by methods of the inventive concept, generally may be composed of about 95%, about 96%, about 97%, about 98%, about 99%, up to about 100% carbon. In some embodiments, the carbon products may exhibit an SEM-EDS showing a composition of about 95% carbon and less than about 3% heteroatoms (N, O, and/or S). In some embodiments, carbon products of the present inventive concept, and carbon products prepared by methods of the inventive concept, may exhibit an X-ray photoelectron spectroscopy (XPS) for carbon-1s having a large $\pi$-$\pi$* shakeup peak at about 291.2 eV. In some embodiments high-resolution TEM shows carbon products of the present inventive concept may have a carbon d-spacing of about 0.37-0.40 nm. In some embodiments, carbon products of the present inventive concept, and carbon products prepared by methods of the inventive concept, may exhibit an X-ray diffraction (XRD) pattern with a maximum at 2θ of about 23°. It will thus be appreciated that carbons and carbon products of the present inventive concept, and carbons and carbon products prepared by methods of the present inventive concept, may have a carbon content of greater than about 95%, or even greater than about 97%, an electrical conductivity of greater than about $10^3$ S/m or even greater than about $10^5$ S/m, and a surface area greater than about 500 m²/g, about 600 m²/g, about 700 m²/g, about 800 m²/g, about 900 m²/g, about 1,000 m²/g, about 1,100 m²/g, or even greater than about 1,200 m²/g.

Without wishing to be bound by any theory, methods for preparing carbon products of the present inventive concept may include a catalyst for growing carbons and carbon products, and a support/template on which carbons and carbon products are grown/propagated. In some embodiments, the catalyst and the support/template in the methods of the inventive concept are the same structure, and/or of the same composition/material. In some embodiments, the composition/material of the catalyst and/or support/template may include, but are not limited to, a metal, metal hydroxide, metal carbonate, or metal oxide, and the like. The metal/metal ion included in the catalyst may be any that may promote catalytic formation of carbons and carbon products by, for example, CVD, or by reactions in which the catalyst is regenerated in the formation of carbons and carbon products, such as, for example, Ca, La, Li, Mg, Sc, and Y. In some embodiments, the metal/metal ion included in the catalyst and/or support/template may be La/La³⁺, for example, LaCO₃OH/LaCO₃O₂. In some embodiments, the LaCO₃OH/LaCO₃O₂ may be in the form of microspheres. In some embodiments, the metal/metal ion included in the catalyst and/or support/template may be Ca/Ca²⁺, for example, Ca(OH)₂ and/or CaO. In some embodiments, the CaO may in the form of nanostructures, such as nanoparticles or nanopowders, or nano-CaO. In some embodiments, the metal/metal ion included in the catalyst and/or support may be Mg/Mg²⁺, for example, Mg ribbons and/or foil. In other embodiments, the catalyst and/or support may be a metal alloy, for example, but not limited to a 95:5 Mg:Al alloy. In some embodiments, the catalyst may be doped into a support/template, for example, a metal oxide support. The form of the catalyst and/or support may be any that would be appreciated by one of skill in the art for growing/forming carbons and carbon structures. Such forms may include, but are not limited to, for example, ribbons, sheets, foils, microspheres, and the like, suitable for forming carbons and carbon structures including but not limited to crumpled carbon/crumpled graphene, for example, a layer, a few layers, or multiple layers thereof, graphene layers and graphene fibers, hollow nanospheres, cup-stack tubes, carbon nanotubes, etc.

In some embodiments, methods of preparing carbons and carbon structures of the inventive concept include heating the catalyst and support/template in, for example, a tube furnace under, for example, a constant flow of an inert gas. The flow rate of the inert gas, for example, nitrogen, may be any flow rate suitable, for example, a flow rate of 200 mL/min., for preparing carbons and carbon structures as would be appreciated by one of skill in the art. The flow rate of the inert gas, for example, nitrogen, may be maintained through all steps of the method through completion of the annealing step. The catalyst and support/template may be heated to a first temperature. In some embodiments, heating of the catalyst and template may be performed gradually. For example, the catalyst and template may be heated in the tube furnace to a temperature, for example, in a range of about 300° C.-700° C., a range of about 400° C.-700° C., or a range of about 600° C.-700° C., i.e., a temperature at which the catalyst and support is exposed to a carbon source, at a rate of about 5° C./min., but is not limited thereto. Once the desired temperature is reached, for example, in some embodiments, a temperature of about 600° C. or about 650°

C., the catalyst and support may be exposed to the carbon source, and may be exposed to the carbon source for a first period of time. In some embodiments of the inventive concept, the carbon source may be acetylene.

Exposure of the catalyst and support to the carbon source may include exposing the catalyst and support to the carbon source at a flow rate, for example, about 30 mL/min., and may include, at the same time, exposure to, for example, a constant flow of steam/water vapor, or H₂S at, for example, about 1.75 mL/h to about 2.5 mL/h. In some embodiments, the flow of H₂O may be about 2.0 mL/h or less than about 2.0 mL/h. The first period of time that the catalyst and support is exposed to the carbon source is not particularly limited. For example, the first period of time may be in a range of about 0.3-5 h. The flow of the carbon source and steam/water vapor/H₂S and the first period of time may be selected dependent upon a desired carbon structure/product. In some embodiments, the first period of time may be about 0.3 h. In some embodiments, the first period of time may be about 1.5 h. During the first period of time, the flow of the inert gas is maintained, e.g., N₂ at about 200 mL/min. as described above.

Following exposure of the catalyst and support to the carbon source for the first period of time, flow of the carbon source, as well as any steam/water vapor or H₂S, is terminated, and the catalyst and support/sample are subjected to an annealing process at a second temperature for a second period of time. Similar to the first temperature and the first period of time, the second temperature and the second period of time are not particularly limited, and may be any temperature and period of time suitable for an annealing process in the preparation of carbons and carbon products. Heating the catalyst and support/sample to the annealing temperature may also be performed gradually, for example, heating up to the annealing temperature at a rate of about 5° C./min. In some embodiments, for the annealing process, the second temperature may be about 900° C. and the second period of time may be about 2 h. During the second period of time, the flow of the inert gas is maintained, e.g., N₂ at about 200 mL/min. as described above.

Following annealing, the carbon product/sample may be washed with, for example, hydrochloric acid, or hydrochloric acid and water, to remove a lanthanum or a magnesium-containing catalyst and support, or to more rapidly remove a calcium-containing catalyst and support, or water to remove a calcium-containing catalyst and support, and dried at, for example, about 90° C. or about 100° C., or in a range of about 90° C. to about 100° C., or similar temperature.

Having described various aspects of the present inventive concept, the same will be explained in further detail in the following examples, which are included herein for illustration purposes only, and which are not intended to be limiting to the inventive concept.

Example 1

Generation of Nanostructured Carbon Using a Lanthanum Catalyst

Experimental

1. Materials.

All chemicals were commercially sourced and used as received. The lanthanum nitrate hydrate (99.9%) and D-(+)-glucose (99%) were obtained from Alfa Aesar. Acrylamide (99%) was purchased from Sigma and ammonium hydroxide (28 wt %) from EMD Chemicals, Inc. The hydrochloric acid (36 wt %) was sourced from Fisher Scientific. Dissolved acetylene and high purity nitrogen were obtained from Airgas.

2. Synthesis of $LaCO_3OH/La_2CO_3O_2$ Microsphere Flowers

Lanthanum microsphere flowers (2-7 mm) were synthesized as previously reported [7]. In summary, 1.08 g lanthanum nitrate hydrate $(La(NO)_3.6H_2O)$, 0.90 g (D-(+)-glucose), and 0.53 g acrylamide were combined in 40 mL of water and $NH_4OH$ was added dropwise until the pH ~10. The reaction was stirred for 5 h, then placed in a 45 mL teflon lined autoclave at 180° C. for 72 h. The resulting orange product was washed with 50/50 water/ethanol and then dried at 90° C. overnight.

3. Synthesis of Carbon Microsphere Flowers

The lanthanum microsphere flowers were placed into an alumina boat inside a horizontal tube furnace. The furnace was heated at a rate of 5° C./min to 600° C. under a 200 mL/min high purity nitrogen flow. Once the temperature reached 600° C., 30 mL/min of acetylene and 2 mL/h of water were passed through the furnace for 1.5 h. The water was preheated to 150° C. as steam before introduction into the tube. Subsequently, the acetylene and water flows were discontinued and the temperature was increased to 900° C. for 2 h and then cooled. The resulting product was washed with concentrated hydrochloric acid to remove the $La(OH)_3$ template, rinsed several times with water, and dried at 90° C. overnight.

4. Characterization

The microsphere morphologies were analyzed via a JEOL 2100F 120 keV transmission electron microscope (TEM) and a Zeiss LEO Model 1530 VP scanning electron microscope (SEM) at 15 keV. Powder X-ray diffraction was performed with a Rigaku Ultima IV X-ray diffractometer affixed with a Cu j a radiation source and nickel filter from $2\theta=15-60°$ at scan rate of 1°/min. The $N_2$ adsorption/desorption isotherms were collected on a Quantachrome Instruments Autosorb-1 at 77 K where surface area and pore diameter were determined from the multipoint Brunauer-Emmett-Teller (BET) and quenched solid state functional theory (QSDFT) analysis methods, respectively. The QSDFT calculation parameters were set as follows: Carbon, slit and cylinder pores, equilibrium mode. The Raman spectra was recorded with a Thermo Scientific DXR Raman Microscope equipped with a 532 nm laser. The spectrum was acquired with a 900 lines/mm grating and 10× objective lens at a power of 8.0 mW. The X-ray photoelectron spectroscopy (XPS) spectrum was obtained with a PHI 5600 spectrometer equipped with an Al Ka monochromatic X-ray source (1486.6 eV, $7\times10^{-10}$ Torr) and a hemispherical analyzer. The spectrum peak fitting was subsequently analyzed with CASA XPS software.

Results and Discussion

The cartoon depicted in FIG. 1 shows the synthesis route for nanocasting carbons from lanthanum microsphere flowers. The beginning step entails mixing lanthanum nitrate, glucose, acrylamide, and ammonium hydroxide and heating the mixture in a hydrothermal autoclave. The lanthanum microspheres flowers are removed and wet acetylene deposits additional carbon to the template via CVD. Finally, the lanthanum template is extracted with HCl to form a negative carbon replica of the microsphere flowers. Note that a control study showed that without the deposition of carbon from the acetylene pyroysis, the carbon derived from the copolymer did not retain the microsphere flower morphology.

Figures 2A, 2B, 2C, 2D, 2E, 2F:
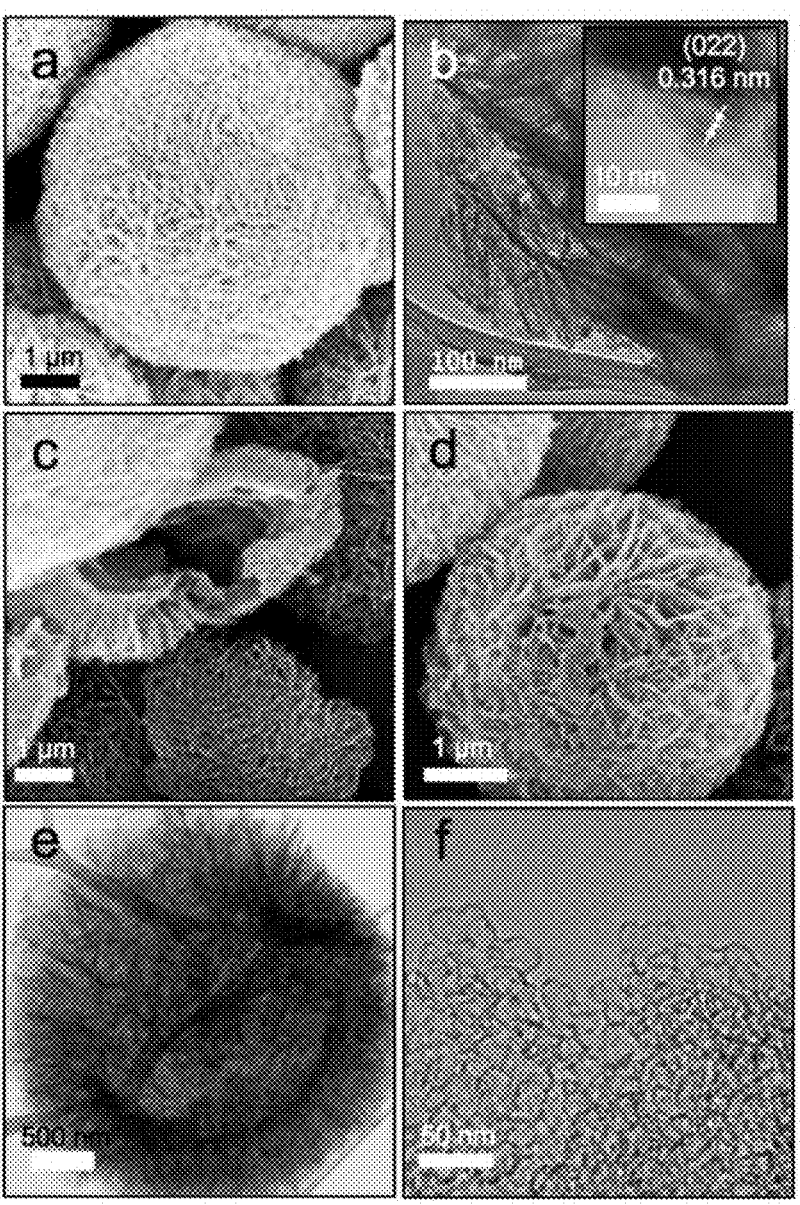

FIG. 2A displays the $LaCO_3OH/La_2CO_3O_2$ microsphere flowers have sheet like layers from 20 to 40 nm in a spherical morphology. The microflower shape is composed of 5-20 nm lanthanum based nanocrystals linked by a graft copolymer matrix. The orange color likely arises from conjugated organic heterocycles formed during hydrothermal synthesis [8]. The microsphere sheet-like layers are shown in FIG. 2B with an inset of the (0 0 2) lattice fringes from a $La_2CO_3O_2$ d-spacing of 0.316 nm. FIGS. 2C and 2D show the microsphere flower carbons after lanthanum is removed. The SEM in FIG. 2C and TEM in FIG. 2E indicate the carbon microsphere flowers have a large hollow cores as well as interconnected sheet-like carbon layers. The 3-D spherical pore structure, 2-D layered sheets, and hollow core, suggest this carbon morphology will have high porosity and 360° accessibility allowing for rapid diffusion of materials into the pores. Compared to the lanthanum wrinkled silica and the lanthanum zeolite structures; in this method the catalyst and template are the same material. The TEM images in FIGS. 2E and 2F illustrate of the carbon microsphere flowers as well as the carbon sheets. The outside edges of the carbon sheets are thin and the carbon sheet thickness increases towards the core of the microsphere.

Figures 3A, 3B, 3C, 3D:
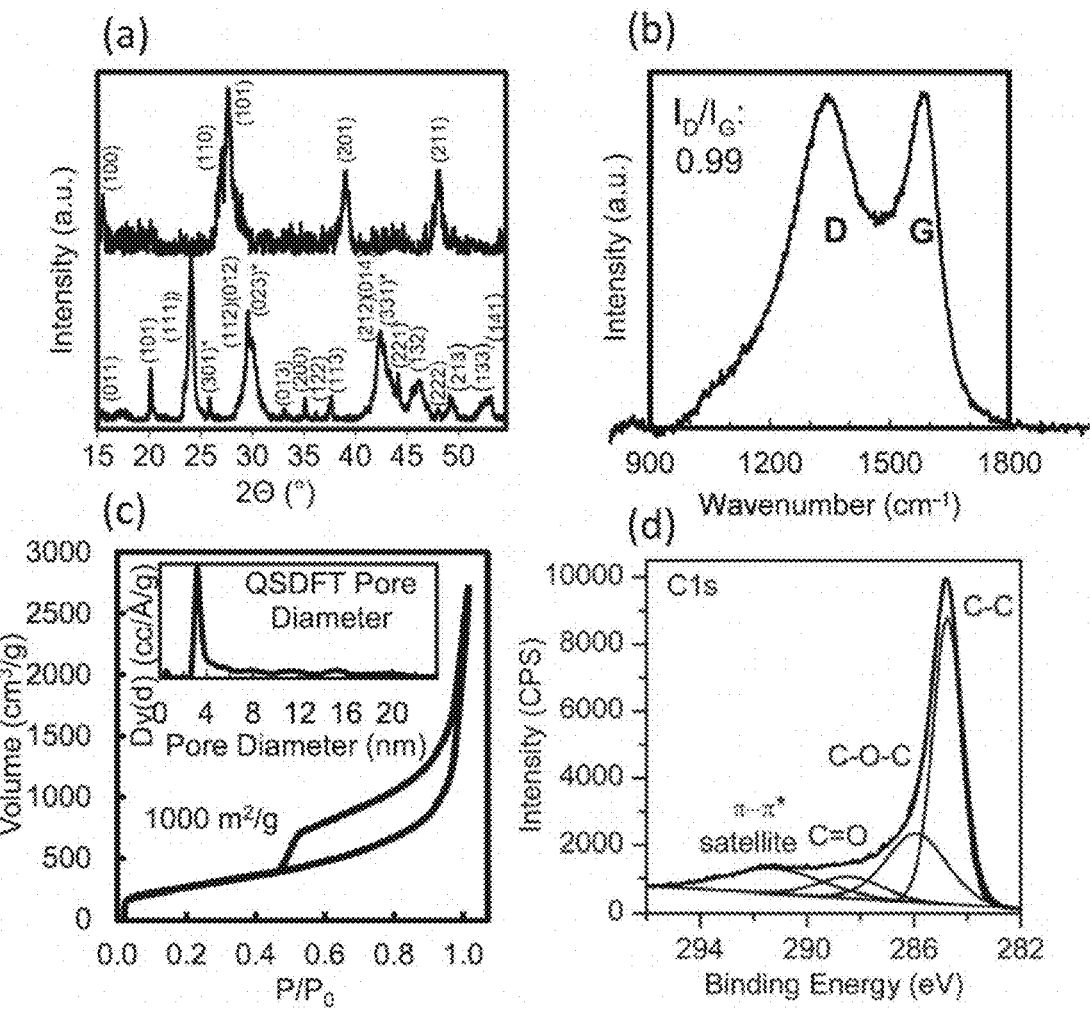
FIGS. 3A-3D is set of graphs showing.
Figure 4:
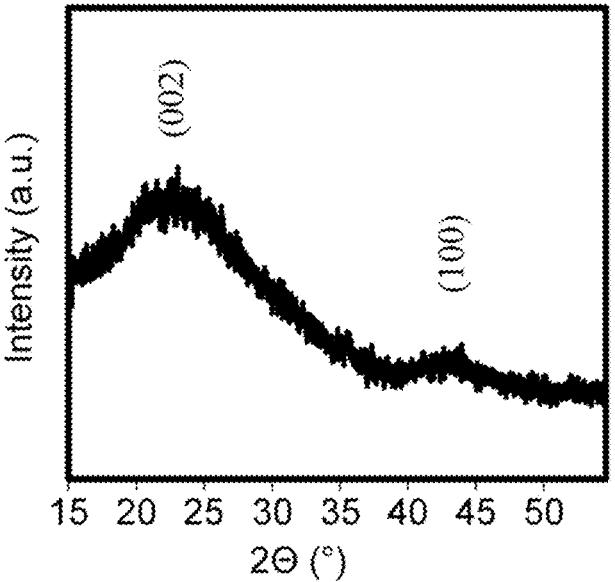
FIG. 4 is a graph showing Carbon PXRD after the lanthanum is extracted shows the (002) and (100) Bragg indices.

The PXRD in FIG. 3A (bottom) shows a mixed phase of lanthanum carbonate hydroxide and lanthanum carbonate oxide after the microsphere flowers are synthesized. Then, post-CVD the PXRD in FIG. 3A (top) shows the lanthanum carbonates are fully converted into to lanthanum hydroxide. The conversion is a result of heat and steam. In FIG. 3A (bottom), the Bragg reflections were indexed to lanthanum carbonate oxide and lanthanum carbonate hydroxide as ICDD-PDF #04-012-3840 and ICDD-PDF #04-009-6412, respectively. The Bragg reflections in FIG. 3A (top) PXRD were indexed to lanthanum hydroxide using JCPDS no. 36-1481. See FIG. 4 for a graph of Carbon PXRD after the lanthanum is extracted showing (002) and (100) Bragg indices.

The Raman spectrum (FIG. 3B) exhibits an ID:IG ratio of 0.99, which indicates high graphitic content. In FIG. 3B the G band indicates that there is a significant amount of $C-sp^2$ hybridized carbon. [9] Furthermore, then broadness of the D band is indicative of 5 and 7 ring $C-sp^2$ hybridized carbon [10]. The D-band also is composed of $C-sp^3$ hybridized carbon most likely from the graft copolymer of glucose and acrylamide. The carbon consists of a decomposed graft copolymer as well as decomposed acetylene, so both $C-sp^3$ (D-band) and $C-sp^2$ (G-Band) hybridization is expected. Without the deposition of carbon from the acetylene pyrolysis, the copolymer carbon did not retain the microsphere flower morphology. Previously, groups utilizing the lanthanum water CVD method for carbon growth show only $C-sp^2$ carbons are generated with high electrical conductivity equivalent to Au (1 1 1) [5].

The specific multipoint BET in FIG. 3C shows a type IV isotherm with type C hysteresis indicative of slit shape pores as well as mesopores [11]. The microsphere flower carbon surface area had a high specific surface area of 1,000 $m^2/g$. The QSDFT pore size distribution FIG. 3C illustrates an average pore diameter of 3.385 nm, as well as some larger mesopores in the range of from 5 to 15 nm. The QSDFT also calculated a pore volume of 2.498 cc/g. QSDFT was developed as a more precise method of analyzing hierarchically structured materials with surface roughness [12]. Specifically, the QSDFT method is superior to other pore calculations including the NLDFT method when quantifying porous carbons. As shown in FIG. 3D, X-ray photoelectron spectroscopy (XPS) core level analysis was conducted to quantify the relative ratio of C—C, C—O—C, and C═O present in carbon samples. FIG. 3D illustrates the relative amounts of C—C, C—O—C, and C═O as 61.11%, 29.32%, and 9.57%, respectively. Additional to the C—C, C—O—C, and C═O, peaks at 281.7 eV, 282.8 eV, and 285.5 eV; a large π-π* transition satellite peak at 288.5 eV is representative of strong π-π stacking of aromatic carbons [13].

Conclusion

Carbon microsphere flowers were synthesized from a lanthanum-catalyzed graft copolymer and the pyrolysis of acetylene gas. This work shows that lanthanum microstructures can be nanocast for the production for graphitic and high surface area carbons. This method uses a lanthanum-based material as the template and the catalyst unlike known nanocast carbons that use lanthanum impregnated silica and alumina templates. The hollow core, 3D pore structure, and interconnected 2D sheet-like layer will allow for rapid diffusion in and out of the pores. The potential applications of the microsphere flower carbons are as catalyst supports, adsorbents, and energy storage applications.

Figure 5:
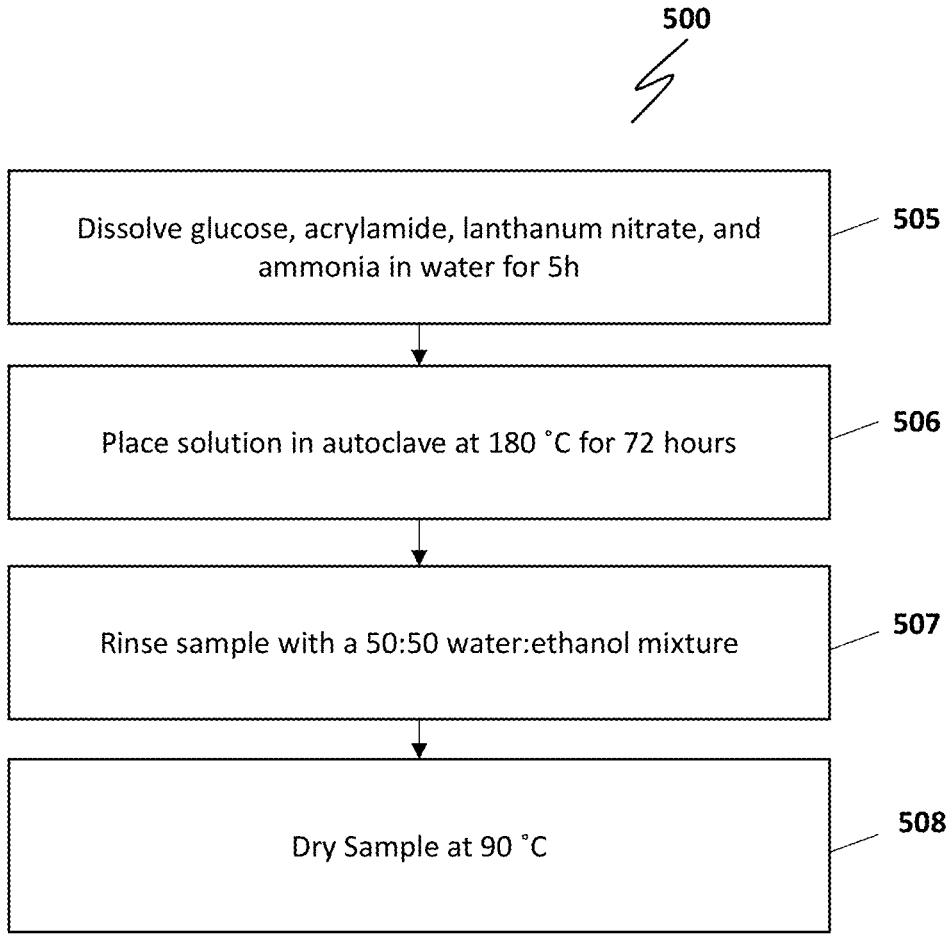
FIG. 5 is a flow chart diagram of a process for the synthesis of lanthanum microspheres.

Referring to FIG. 5, a process 500 for the synthesis of lanthanum microspheres is shown. Process 500 synthesizes the lanthanum microspheres from a graft polymerization. The process begins at step 505 where glucose, acrylamide, lanthanum nitrate and ammonia are dissolved in water for a period of about 5 hours. At step 506, the resulting solution is placed in an autoclave and brought to a temperature of 180° C. and held for 72 hours. During step 506, the solution forms a solid sample of lanthanum microsphere templates. At step 507, the solid sample is rinsed with a 50:50 water:ethanol mixture and, at step 508, the solid sample is dried at 90° C.

Figure 6:
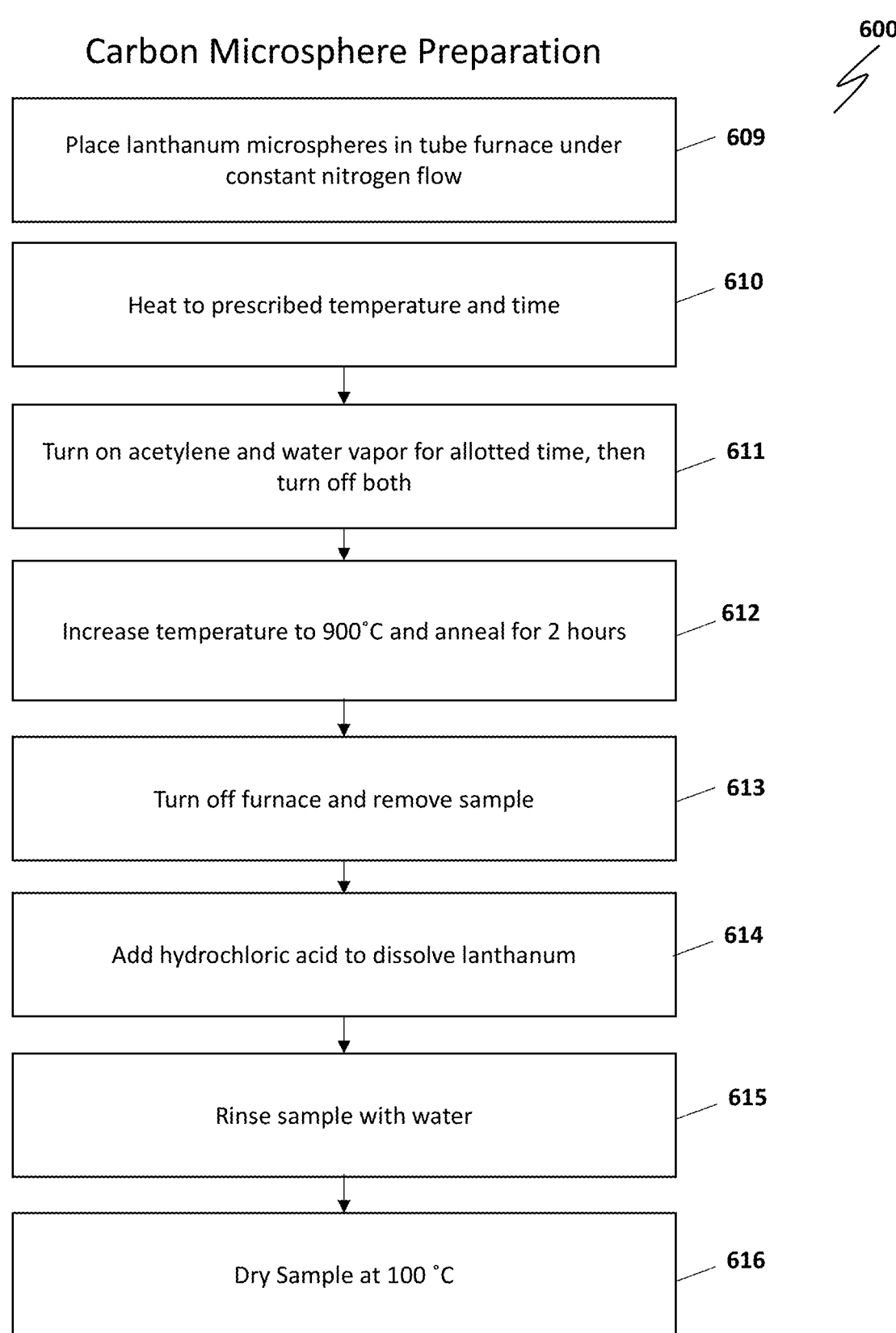
FIG. 6 is a flow chart diagram of a process for converting the lanthanum microsphere templates to graphitic carbon structures.

Referring to FIG. 6, a process 600 for converting the lanthanum microsphere templates to graphitic carbon is shown. The process begins at step 609 wherein the solid sample of lanthanum microsphere templates are placed in a tube furnace under constant nitrogen flow and then heated to a prescribed temperature and time (step 610). In a preferred embodiment, the prescribed temperature is about 600° C. and prescribed time is about 1.5 hours. During step 610, when the temperature of the solid sample reaches 600° C., acetylene and water vapor are passed over the solid sample for an allotted time and the acetylene and water vapor are then turned off. At step 612, the furnace temperature is increased to about 900° C. and the solid sample is annealed for about 2 hours. At step 613, the furnace is turned off and the sample is removed. Then at step 614, the solid sample is immersed in hydrochloric acid to dissolve the lanthanum. At step 615, once fully dissolved, the resulting solid is rinsed with water and then dried at 100° C. Once dried, the resulting sample is a graphitic carbon microsphere structure.

References in Example 1

[1] C. S. Chan, G. De Stasio, S. A. Welch, M. Girasole, B. H. Frazer, M. V. Nesterova, S. Fakra, J. F. Banfield, Science 5664 (2004) 1656.
[2] S. Takenaka, M. Ishida, M. Serizawa, E. Tanabe, K. Otsuka, J. Phys, Chem. B 31 (2004) 11464-11472.
[3] O.-K. Kim, J. R. Griffith, J. Polym. Sci., Part A: Polym. Chem. 1 (1975) 151-160.
[4] T.-W. Kim, I.-S. Park, R. Ryoo, Angew. Chem. 36 (2003) 4511-4515.
[5] H. Lee, K. Kim, S.-H. Kang, Y. Kwon, J. H. Kim, Y.-K. Kwon, R. Ryoo, J. Y. Park, Sci. Rep. (2017) 11460.

12

[6] Z. Wang, S. Perananthan, S. D. Panangala, J. P. Ferraris, K. J. Balkus, J. Nanosci. Nanotechnol 1 (2018) 414-418.
[7] C. Sun, G. Xiao, H. Li, L. Chen, J. Am. Ceram. Soc. 8 (2007) 2576-2581.
[8] H. Li, G. Lu, Q. Dai, Y. Wang, Y. Guo, Y. Guo, ACS Appl. Mater. Interfaces 3 (2010) 838-846.
[9] A. Mannai, S. Saidi, A. Souissi, F. Gmati, A. Belhadj Mohamed, J. Phys. D: Appl. Phys. 33 (2013) 335103.
[10] K. Kim, Y. Kwon, T. Lee, S. J. Cho, R. Ryoo, Carbon (2017) 517-523.
[11] K. Sing, R. Williams, Adsorpt. Sci. Technol. 10 (2004) 773-782.
[12] J. Landers, G. Y. Gor, A. V. Neimark, Colloids Surf., A (2013) 3-32.
[13] L. Wegewitz, A. Prowald, J. Meuthen, S. Dahle, O. Hofft, F. Endres, W. Maus-Friedrichs, Phys. Chem. Chem. Phys. 34 (2014) 18261-18267.

Example 2

Generation of Porous Structured Carbon Using a Calcium-Based Catalyst

The standard industrial reaction between calcium carbide and water at room temperature forms acetylene; a highly exothermic reaction that has been extensively studied for the production of polyvinylchloride (PVC) and acetylene lamps[33-34]. A mostly unknown reaction shows at high temperatures (<500° C.) $CaC_2$ reacts with water to form hydrogen gas and carbon, thus breaking the strong C—H bonds[16-17]. We take advantage of this phenomenon to have a cyclic catalytic formation of crumpled graphene via the continual addition of acetylene and water.

The mechanism of acetylene formation from calcium carbide has been overwhelmingly studied for the major industrial processes for the production of acetylene lamps and polyvinyl chloride[34]. The seminal study for the reaction of $CaC_2$ with water at high temperature was studied by Caropreso in 1969 where at high temperatures the calcium carbide reacts with water to form carbonaceous material and hydrogen gas[16].

Equation 1 shows the overall mechanism reaction. Equation 2 and 3 show the step-by-step reaction of $Ca(OH)_2$ to carbon. It is well known that of $CaC_2$ combined with water forms acetylene gas, but the high temperature carbon and hydrogen gas formation is relatively unreported. In equation 3, once the radical $C_2^{2-}$ ion is formed it can then polymerize into a network of aromatic carbons. A recent study shows that a minute amount of graphene can be produced from $CaC_2$ and an oxidant at high temperature[17].

$$Ca(OH)_2 + C_2H_2 + H_2O \xrightarrow{\Delta} Ca(OH)_2 + C_2^{2-} + H_2O + H_2\uparrow \quad (1)$$

$$Ca(OH)_2 + C_2H_2 \xrightarrow{\Delta} CaC_2 + 2H_2O \quad (2)$$

$$CaC_2 + 2H_2O \xrightarrow{\Delta} Ca(OH)_2 + C_2^{2-} + H_2\uparrow \quad (3)$$

Figure 7:
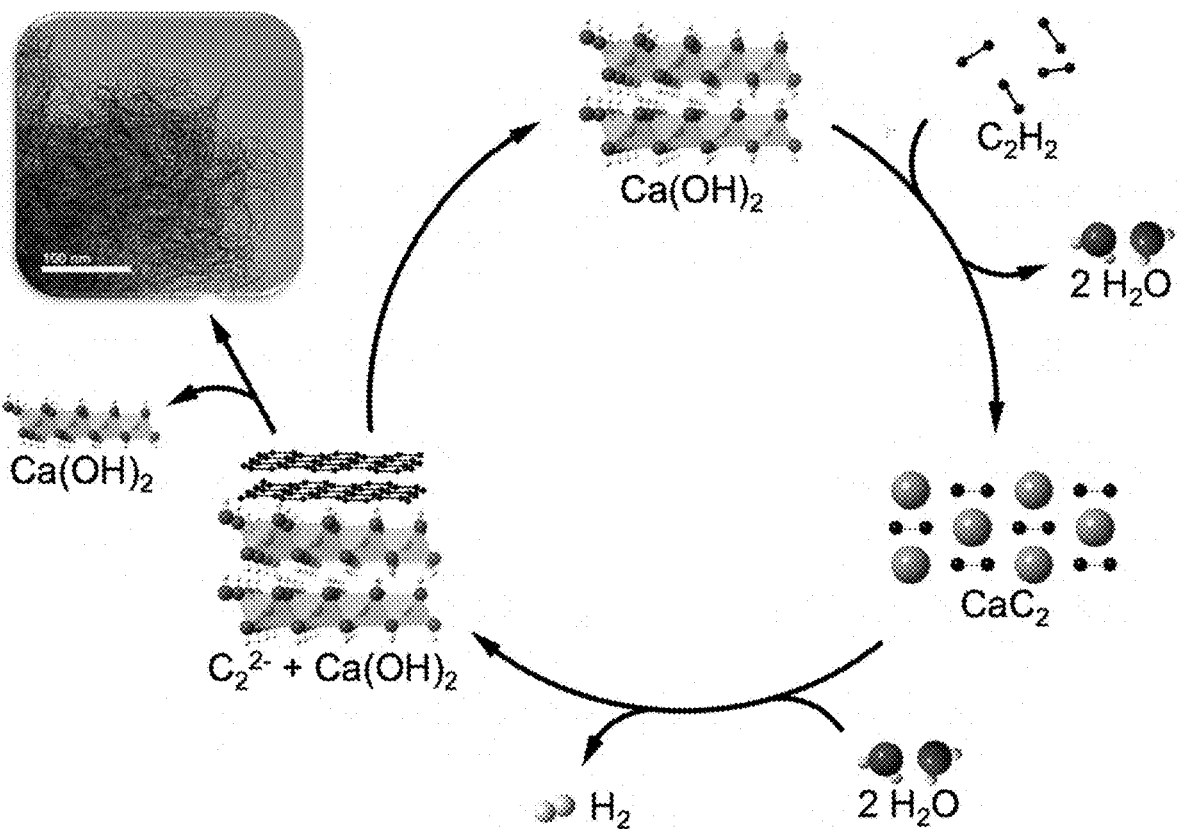
FIG. 7 is a schematic diagram of the catalytic cycle for the formation of Ca(OH)$_2$ catalyzed carbons according to embodiments of the present inventive concept.

FIG. 7 shows a graphical representation of the catalytic cycle for the formation of $Ca(OH)_2$ catalyzed carbons. The $Ca(OH)_2$ is exposed to acetylene and water vapor at 650° C. where the $C_2H_2$ binds to the surface of the calcium, water is removed, and a $CaC_2$ structure is formed. Water then reacts with the calcium carbide reforming $Ca(OH)_2$ and producing $H_{2(g)}$ and $C_2^{2-}$ ion radicals. We take advantage of adding more acetylene and water, for a cycle of catalyst regeneration and continuous carbon generation. The reaction will continue to form layers of carbon with the continuous addition of acetylene and water. Finally, the calcium hydroxide can be removed from the graphene-like carbon using water.

The calcium carbide structure is similar to an ionic salt, where each $Ca^{2+}$ coordinates orthogonally to the $C_2^{2-}$ acetylide ion. The formation of the crumpled carbon generally forms by the acetylene forming via an ionic interaction with the calcium oxide surface resulting in calcium carbide. Then hydrogen is removed, forming an acetylide radical. The acetylide radical then can polymerize into a crumpled graphene structure.

A high ratio of water (>2.0 mL/h) during synthesis limits the carbon growth likely because with excess water the $CaC_2$ intermediate is less likely to be formed and instead an edge growth polymerization (HACA) by acetylene addition is most likely to form the graphene fibers and carbon nanotubes.

Figure 13:
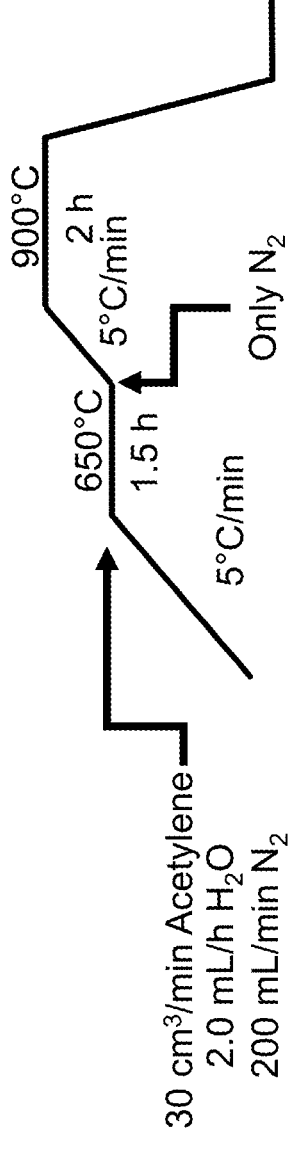
FIG. 13 is a graphical schematic showing the standard protocol for the synthesis of carbon uses 30 mL/min acetylene, 200 mL/min nitrogen, 2 mL/h water for 1.5 h according to an embodiment of the present inventive concept.

The formation of CNTs has been previously studied with an Fe catalyse[35]. The authors found also 650° C. results in the most crystalline carbon based on the FWHM Raman peaks. The CNT form very rapidly in the study and they grow by rapid edge growth of hydrogen abstraction/acetylene addition (HACA) reaction[36]. The calcium-catalyzed crumpled graphene, CNT, and graphene fibers likely all follow this mechanism.

sources including CaO, $CaCO_3$, nanosized CaO, and $Ca(OH)_2$. At step 802, the calcium source is placed in a tube furnace under constant nitrogen flow, after which the tube furnace is heated to reaction temperature (step 804). Typically, the reaction temperature is about 650° C. with a heating time of about 5° C./min (see FIG. 13), however, the reaction temperature may be in the range from 400° C. to 700° C. for a particular calcium source and a desired morphology. At step 806, acetylene flow and water (steam) flow into the furnace are initiated to accomplish carbon deposition onto the calcium source. The carbon deposition continues for an allotted time which may be varied from 0.3 h up to 5 h and then stopped. The water content may be varied from about 1.75 mL/min-2.5 mL/min. The acetylene content/flow rate may be varied from about 15 cc/min to about 70 cc/min. For example, the synthesis method 800 may use 30 mL/min acetylene, 200 mL/min nitrogen and 2 mL/h water for 1.5 h (FIG. 13).

At step 808, after acetylene flow and water flow are stopped, the reaction is annealed at 900° C. for graphitization. At step 810 the furnace is turned off and the resulting product removed. At step 812, the resulting product is then rinsed with water and subsequently dried (step 814). Drying is accomplished, for example, at about 100° C. or similar temperature.

TABLE 1

| Reaction # | Starting Material | $C_2H_2$ (cc/min) | Water (mL/h) | Time (h) | Morphology | FIGS. | Surface Area ($m^2$/g) |
|---|---|---|---|---|---|---|---|
| 1 | CaO | 30 | 2.0 | 0.3 | crumpled (few layers) | 14A-14C | — |
| 2 | CaO | 30 | 2.0 | 1.5 | crumpled (multi layers) | 15A-15F | 1063 |
| 3 | CaO | 30 | 2.5 | 1.5 | graphene fibers/ crumpled carbon | 16A-16D | 1156 |
| 4 | CaO nano | 30 | 2.0 | 0.3 | hollow nano-spheres (few layers) | 17A-17C | 800 |
| 5 | CaO nano | 30 | 2.0 | 1.5 | hollow nano-spheres (multi layers) | 18A-18F | 507 |
| 6 | CaO nano | 30 | 2.5 | 1.5 | cup-stack carbon tubes/ hollow nano-spheres | 19 | — |
| 7 | $Ca(OH)_2$ | 30 | 2.0 | 0.3 | crumpled (few layers) | 20A-20C | 1276 |
| 8 | CaO | 30 | a | 1.5 | Sulfur-doped crumpled carbon | 21A-21E | — |
| 9 | $Ca(OH)_2$ | 20 | 1.75 | 0.3 | carbon nanotubes/ amorphous clumps | 22 | — |
| 10 | $Ca(OH)_2$ | 70 | 2.0 | 0.4 | crumpled (few layers)/ amorphous clumps | 23 | — |
| 11 | $Ca(OH)_2$ 300 g | 30 | 2.0 | 3.0 | crumpled (multi layers) | 24 | — |

The nitrogen gas flow was 200 cc/min. for all reactions.
a $H_2S$ gas at 30 cc/min.

The mechanism of formation reported herein is different from the formation of carbon in Ca-substituted zeolite materials. The negatively charged Ca-zeolite can adsorb and weakly coordinate acetylene/ethylene molecules to the Ca ions within the pores as a crystal structure[37]. Further evidence is that ethylene gas was attempted using calcium as a catalyst, but carbon formation did not occur. The mechanism for the formation of crumpled carbon is through a metal acetylide intermediate and then $C_2^{2-}$ radical are formed and then undergo radical acetylene polymerization. The requirements of a metal acetylide catalyst are a n-backbonding interaction and a hydrophilic/water sensitive; like Mg, Ca, Y, La and other metals.

Figure 8:
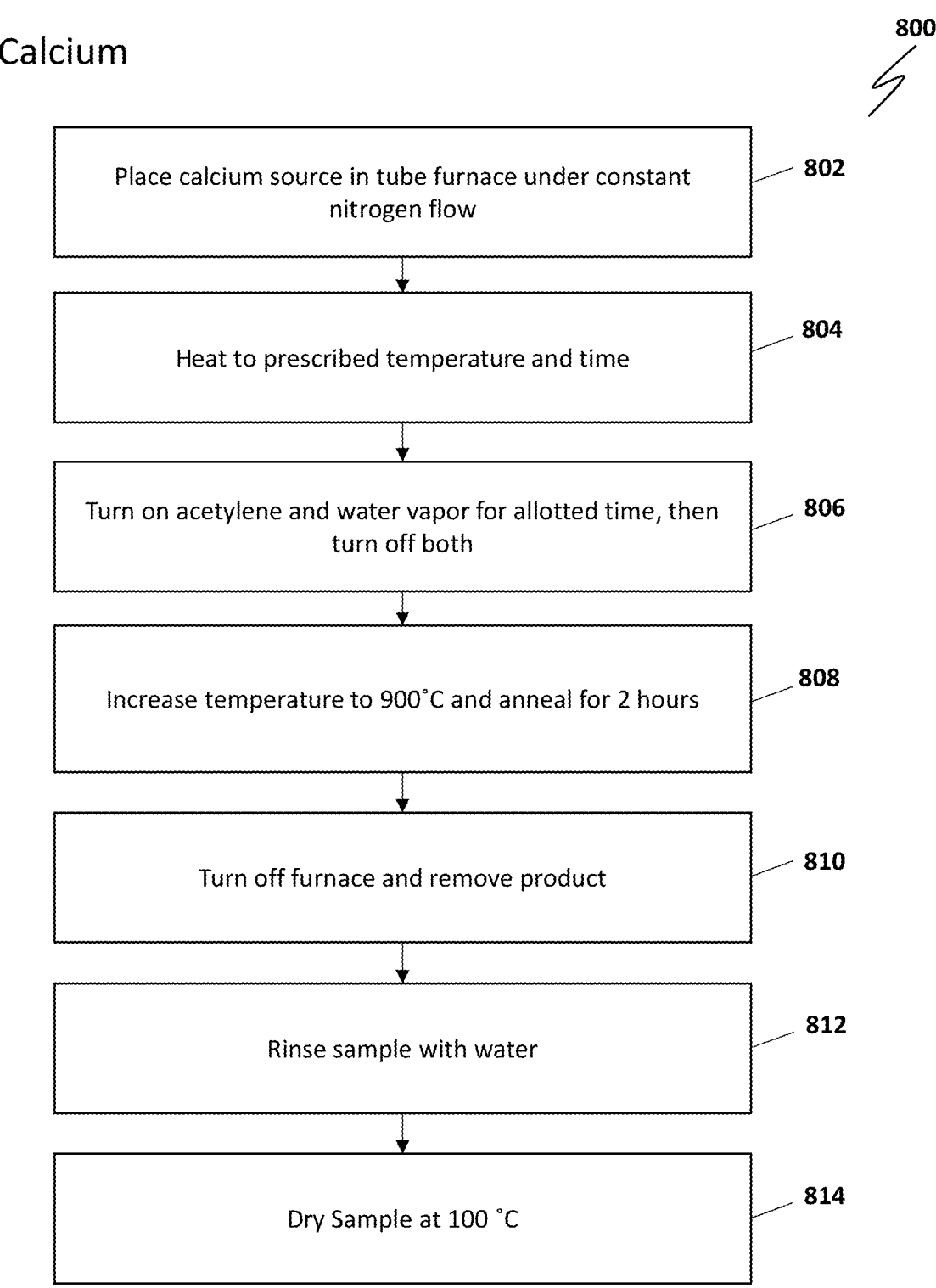
FIG. 8 is a flow chart of synthesis method for producing porous structured carbon materials according to embodiments of the present inventive concept.

Referring to FIG. 8, a variety of carbon structures may be synthesized at various reaction conditions, which are summarized in Table 1. According to synthesis method 800 porous carbon structures are synthesized from a variety of According to method 800, variations in source material, acetylene rate, water rate, temperature, and time result in a variety of calcium-derived carbon morphologies. Table 1 shows a summary of reaction conditions and the resulting carbon structure for a number of reaction condition variations.

Alternatively, $H_2O$ was also substituted with isostructural $H_2S$. Furthermore, a scaled reaction of 300 g was performed, and the used calcium hydroxide recycled for another reaction.

Experimental

1. Materials.

Calcium oxide (99.9%) and nano-calcium oxide (<160 nm, 98%) were purchased from Sigma-Aldrich Inc. and used as received. Calcium carbonate (99.999%) was used as received from Mallinckrodt. Calcium hydroxide (99%) and hydrochloric acid (36 wt %) were obtained from Fischer Chemical, and absolute ethanol (200 proof) was acquired from Decon Labs Inc. Dissolved acetylene and industrial nitrogen were sourced from Airgas and hydrogen sulfide from Matheson Tri-Gas. The 1-Ethyl-3-methylimidazolium bis(trifluoromethylsulfonyl)imide (EMI-TFSI) was purchased from EMD Millipore Company and the poly(tetrafluoroethylene) (PTFE) separator material from Gore™.

2. Synthesis of Crumpled Graphene

The calcium source was first placed in an alumina boat inside a two-inch horizontal quartz tube furnace. The quartz tube furnace was heated to reaction temperatures of 650° C. at a rate of 5° C./min under a 200 mL/min nitrogen flow. At reaction temperature, 30 mL/min. of acetylene and 2.0 mL/h of water were passed over the calcium source for 0.3 h. Water was pumped from a syringe pump attached to a steam generator set to 150° C. Following the reaction, acetylene and steam were turned off and the sample was annealed at 900° C. for 2 h, under a 200 mL/min nitrogen flow. The product washed with deionized water until the calcium was removed, then dried at 90° C. overnight. Modifying the water (1.75-2.5 mL/h), calcium source, temperature (300-700° C.), and reaction time (0.3-5.0 h) resulted in a variety of other carbon structures. In order to decrease the washing time, the scaled reaction for crumpled carbon was washed using hydrochloric acid.

3. Coin Cell Supercapacitor Assembly

Coin cell packaging (Li2032) were used to manufacture the supercapacitors. All assembly was performed in an ultra-high purity argon glove box. The electrodes were prepared by mixing carbon and 3% PTFE binder with an agate pestle and, then rolled between two sheets of metal into a carbon sheet. The electrodes were cut into 11.1 mm circles with 40 μm thickness. The Teflon separator (0.02 mm) was punched out into a 19 mm circle. Current collectors 15.9 mm were cut from carbon coated aluminum. The 80 μL of electrolyte were added to each carbon electrode and placed under vacuum for two days. The coin cell was arranged as: Positive endcap, three stainless steel spacers, current collector, electrode, separator, electrode, current collector, two stainless steel spacers, and negative cap. The coin cells were crimped and sealed at 1100 psi and the exterior was rinsed with ethanol.

4. Characterization

The carbon morphologies were analyzed with a JEOL 2100F 120 keV transmission electron microscope (TEM) and a JEM 2100F 200 keV TEM. For surface imaging and elemental analysis, a Zeiss LEO Model 1530 VP variable pressure field effect scanning electron microscope (SEM) equip with an EDX attachment and operating at an accelerating voltage of 15 keV. Powder X-ray diffraction spectra were collected with a Rigaku Ultima IV X-ray diffractometer with Cu $\kappa_\alpha$ radiation and a nickel filter from $2\theta$=5-70° at a step size of 0.02 and scan rate of 1°/min. The $N_2$ adsorption/desorption isotherms were collected on a Quantachrome Instruments Autosorb-1 at 77 K where surface area and pore size distribution were determined from the Brunauer-Emmett-Teller (BET) and quenched solid state functional theory (QSDFT)[19-20] analysis methods, respectively. The QSDFT calculations were performed as $N_2$ at 77 K with slit and cylindrical pores on adsorption branch. The Raman spectra were recorded with a Thermo Scientific DXR Raman Microscope equip with a 532 nm laser. The Raman spectra were acquired with a 900 lines/mm grating and 10× objective lens at a power of 8.0 mW. A Nicolet 380 Fourier transform infrared spectrometer (FT-IR) was utilized to collect IR spectra from 4000-400 cm$^{-1}$ in a KBr Matrix. A PHI 5600 spectrometer (1486.6 eV, 7×10$^{-10}$ Torr) with a monochromatic Al—K$_\alpha$ X-ray source and hemispherical analyzer was used to acquire X-ray photoelectron spectra (XPS). The system is maintained under UHV conditions. The spectra were analyzed using CasaXPS software, Version 2.3.17PR1.1, to determine the relative ratio of C—C, C=O, and C—O—C bonds observed in the C is core level spectrum for each sample. Elemental analysis of the samples was performed using MultiPak software, Version 9.0.4.7. The electrical resistivities were collected using a Keithley 2400 source meter equip with a Pro4-4400 four-point probe. The electrochemical properties were measured utilizing a BT2000 Arbin Battery Testing System and an EG&G Princeton Applied Research potentiostat/galvanostat (Model 2273A) for electrochemical impedance spectroscopy (EIS). The specific capacitance, energy density, power density, internal resistance, and cell cyclability were calculated from the electrochemical impedance, cyclic voltammetry curves, and galvanostatic charge/discharge curves. The coin cell results were calculated using the total mass of the electrodes.

Results and Discussion

1. Approach

Graphene has many of the desired properties for use in electric EDLCs from its high surface area and high electrical conductivity[21]. Graphene materials are known to have excellent properties as an energy storage material[22-23]. However, graphene tends to restack losing the beneficial properties and it is too expensive for widespread use[24-25].

Utilizing bulk calcium oxide as a catalyst for a graphene-like materials can produce similar properties can be made without the significant production cost or harsh solvents. Bulk calcium hydroxide was chosen as a carbon catalyst due to its cost, solubility in water for extraction, and the scalability of a CVD process. The carbons produced from calcium materials have metallic electrical conductivity, high porosity, and involve a green environmentally friendly process. Current production of graphene involves reducing GO into rGO using harsh acids/bases and other solvents[26], or is synthesized via chemical vapor deposition (CVD) on large plates of copper at temperature >1,000° C. The rGO produced also has low electrical conductivity[27] compared to the CVD formed graphene. Carbons designed for supercapacitors often will have high surface area such as activated carbons[9], or high electrical conductivity such as carbon black[28]; although one usually compromises for the other. The turbostratic sp$^2$-hybridized carbon structures synthesized via calcium hydroxide result in porosity, high surface areas, (>1,000 m$^2$/g), and high electrical conductivity (>10$^5$ S/m).

Synthesized Carbons

Figures 9A, 9B, 9C, 9D, 9E, 9F, 9G, 9H:
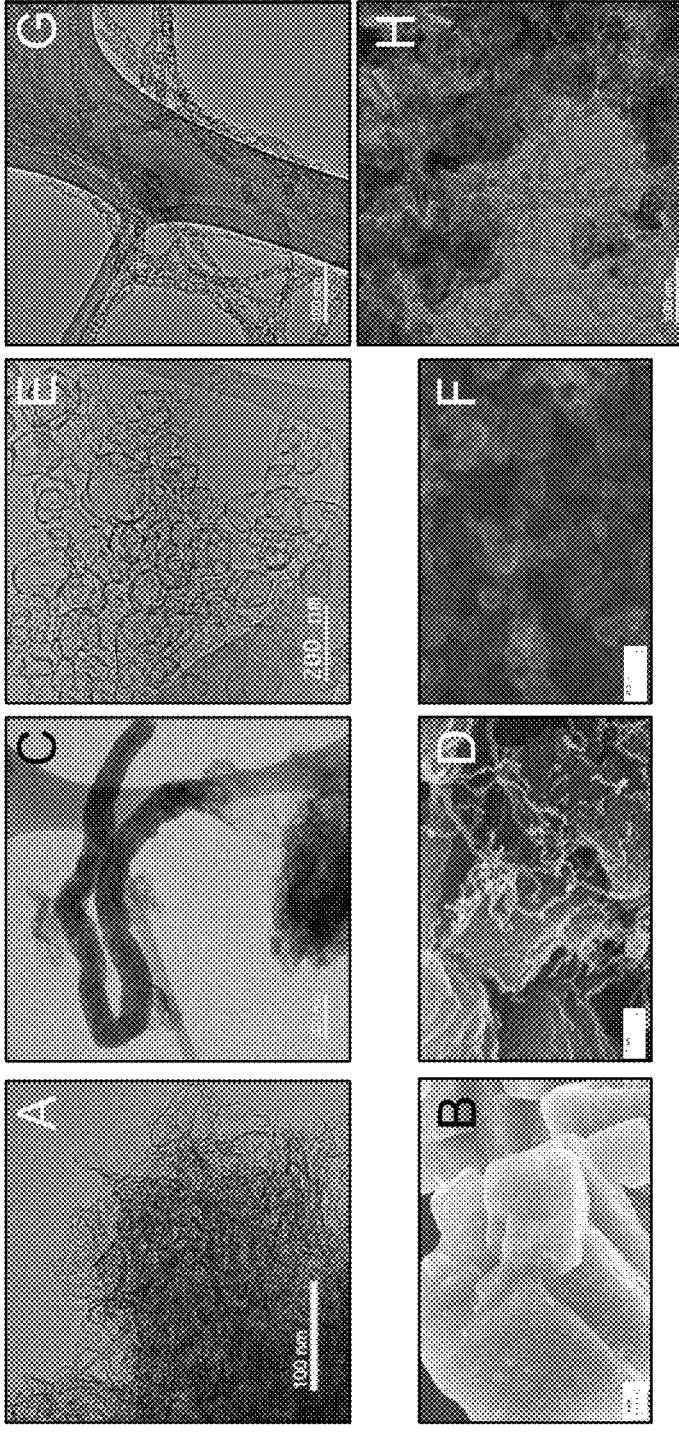

FIG. 9 shows crumpled carbon, graphene fibers, hollow nanospheres, cup-stack tubes, and carbon nanotube morphologies. FIGS. 9A and 9B show the TEM and SEM images of crumpled carbon structure after calcium is removed. FIGS. 9C and 9D show the TEM and SEM images of graphene fibers mixed with crumpled carbon. FIGS. 9E and 9F show the TEM and SEM of hollow nano-sphere carbons from the nanosized CaO source. FIG. 9G shows the TEM image of cup-stack carbon tubes synthesized at a high water ratio. FIG. 9H shows a TEM image of amorphous carbon mixed with carbon nanotubes (CNT) synthesized from a low water ratio.

Crumpled Carbons

Figure 14A:
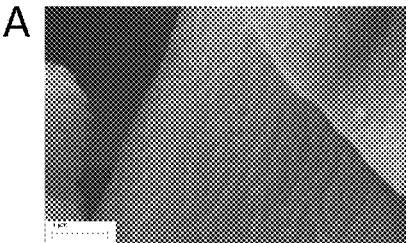
FIGS. 14A-14C show.
Figure 14B:
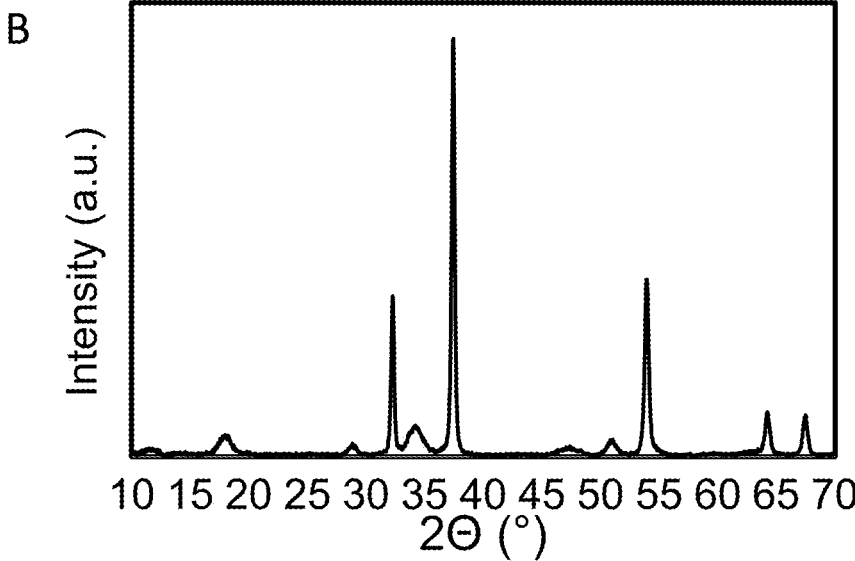
Figure 14C:
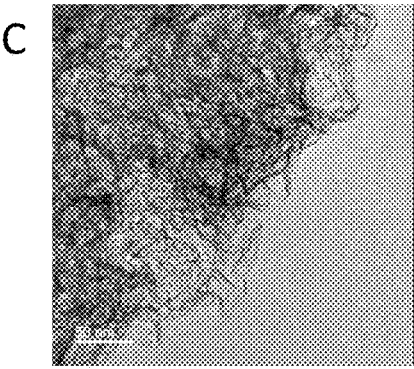
Figures 15A, 15B, 15C, 15D, 15E, 15F:
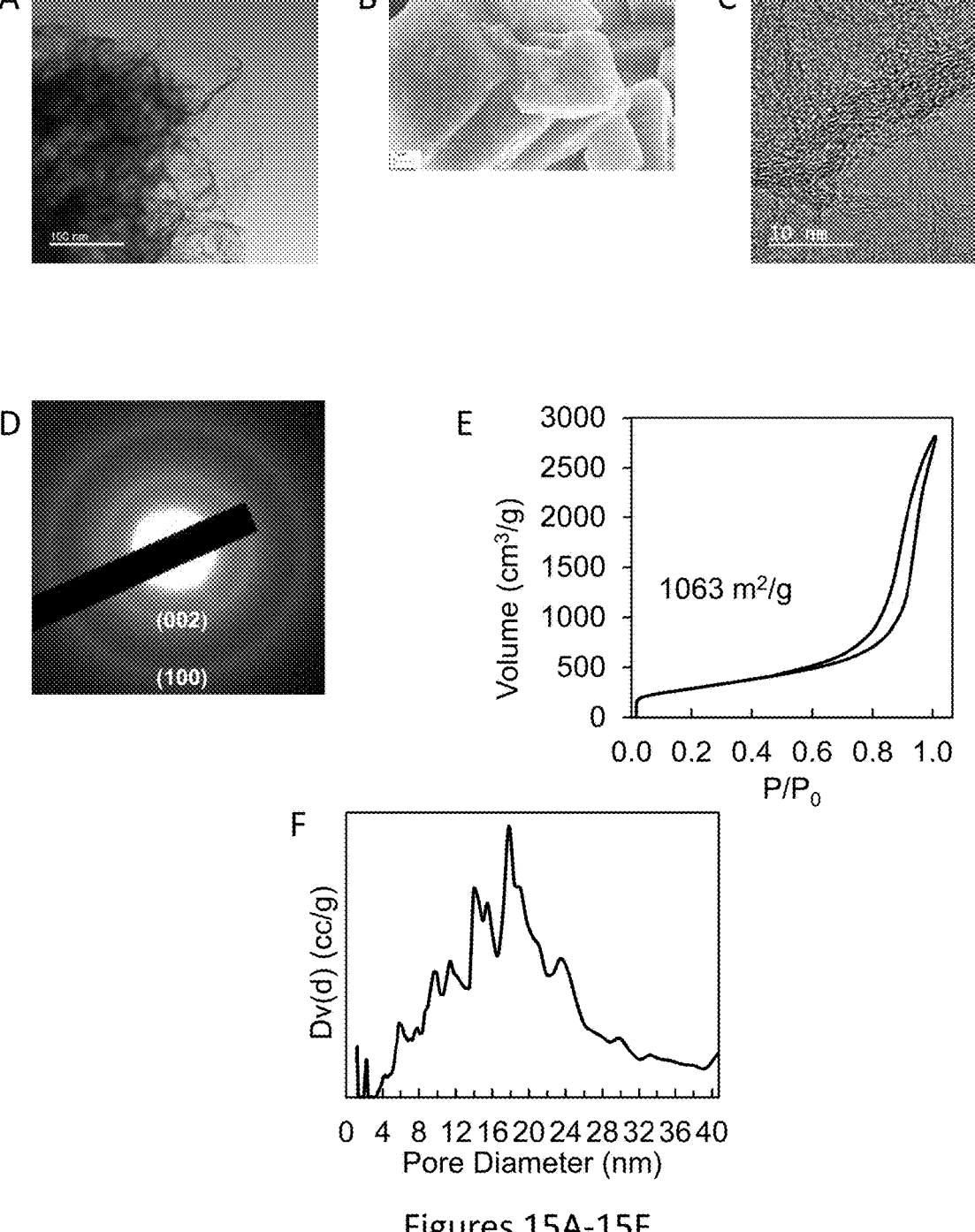
FIGS. 15A-15F show.
Figure 20A:
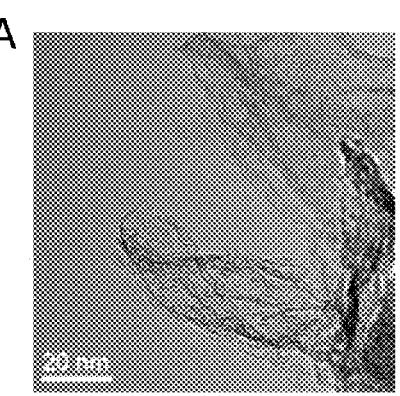
FIGS. 20A-20C show.

Calcium oxide was utilized as a catalyst for the synthesis of few-layered crumpled carbon (R1). The acetylene was deposited for a short time of 0.3 h. The SEM images shows the crumpled carbon on the CaO catalyst (FIG. 14A). The PXRD of crumpled carbon on the calcium catalyst indicates an approximate ratio of (75:25) $CaO:Ca(OH)_2$ (FIG. 14B). After $CaO/Ca(OH)_2$ was extracted, the TEM images shows crumpled carbon with 2-5 carbon layers (FIG. 14C) The crumpled morphology is useful for energy applications because it prevents the restacking of graphene layers commonly occurring in rGO[29]. Calcium oxide was used to synthesize multi-layered crumpled carbon (R2) for a 1.5 h. reaction time. After washing out the calcium, the TEM/SEM images show the crumpled carbon (FIGS. 15A and 15B). High resolution TEM images were taken of the crumpled carbon and 3-9 layers of carbon were observed (FIG. 15C). In addition, the selected-area electron-diffraction pattern showed the (002) and (100) Bragg reflections from the carbon (FIG. 15D). Crumpled carbon was further synthesized using $Ca(OH)_2$ at a short reaction time of 0.3 h (R7). Few-layered crumpled carbon was imaged by TEM (FIG. 20A).

Graphene Fibers

Figure 16A:
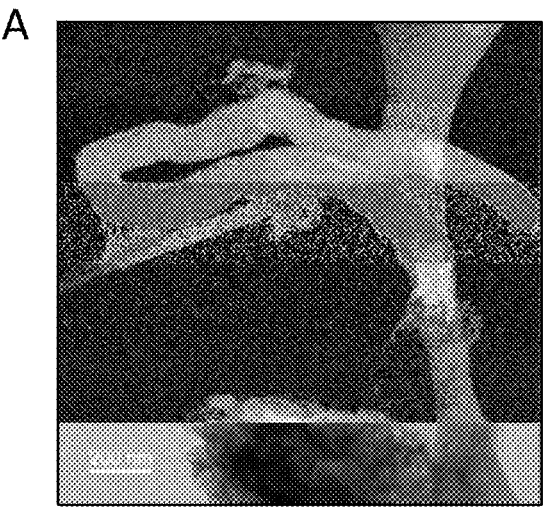
FIGS. 16A-16D show.
Figure 16B:
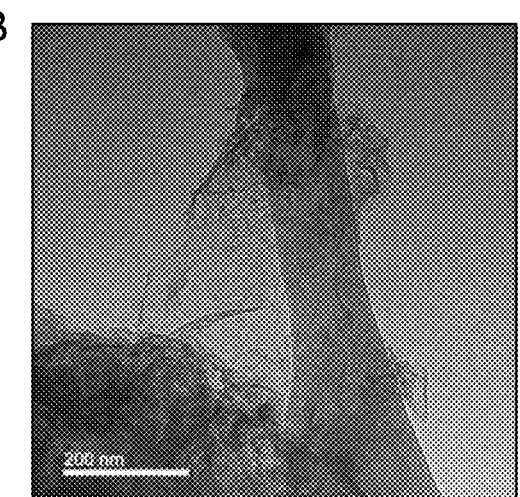
Figure 16C:
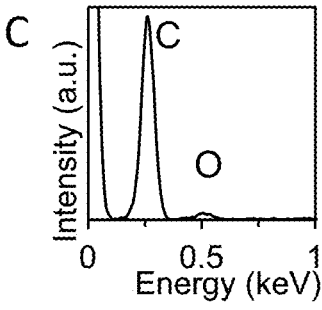

Graphene fibers (R3) were synthesized at an increased rate of water compared to the standard protocol. Graphene fibers are fibers constructed from graphene sheets and can have abnormally high mechanical strength[30-31]. The fibers are approximately 150-225 nm in diameter and have offshoots of crumpled carbon as the fibers unravel. The TEM image shows a fiber and the unraveling of the fiber into a crumpled carbon structure (FIG. 16A). The graphene fibers are observed to have 2-3 layers of carbon in the TEM images (FIG. 16B). The SEM-EDS indicates <3% oxygen in the carbon (FIG. 16C) and the Raman spectroscopy shows a broad D-band with an $I_D:I_G<1.0$ FIG. 16D). A nanosized calcium oxide was also used to form other carbon morphologies.

Hollow Carbon Nanospheres

Figure 17A:
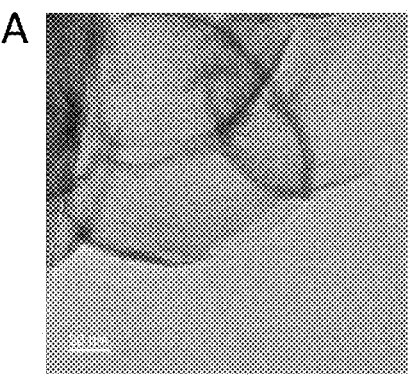
FIGS. 17A-17C.
Figures 18A, 18B, 18C, 18D, 18E, 18F:
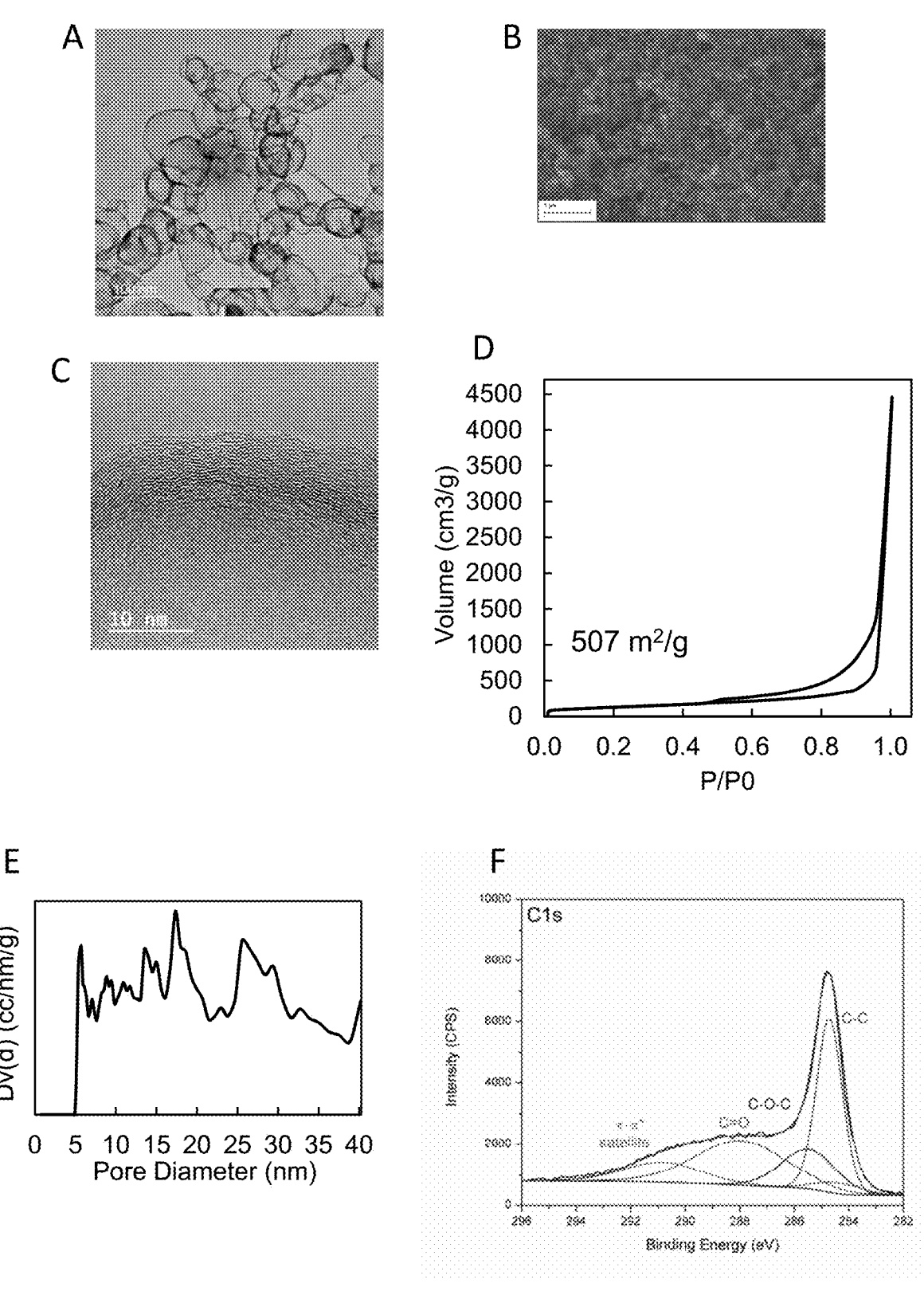
FIGS. 18A-18F show.

Multi-layered (R4) and few layered (R5) hollow nanospheres were synthesized using a nanosized CaO source. The TEM images show an average size of 113 nm measured by ImageJ. The few layered (R4) hollow nanospheres were reacted with acetylene for a short time compared to multi-layered hollow nanospheres. The TEM image shows the few layered hollow nanospheres have an open end where the calcium hydroxide is extracted after synthesis (FIG. 17A). This demonstrates the interior surface area is accessible. The multi-layered (R5) hollow nanospheres were reacted with acetylene for a longer time forming a thicker hollow shell. The TEM and SEM images show the hollow carbon nanospheres (FIGS. 18A and 18B). The TEM image in FIG. 18C shows >15 layers of carbon. The TEM images show that this catalytic reaction can add additional carbon layers the longer the reaction time. Several other reactions conditions produced various carbons.

Other Carbons/Scaled Synthesis/Recyclability

Figure 19:
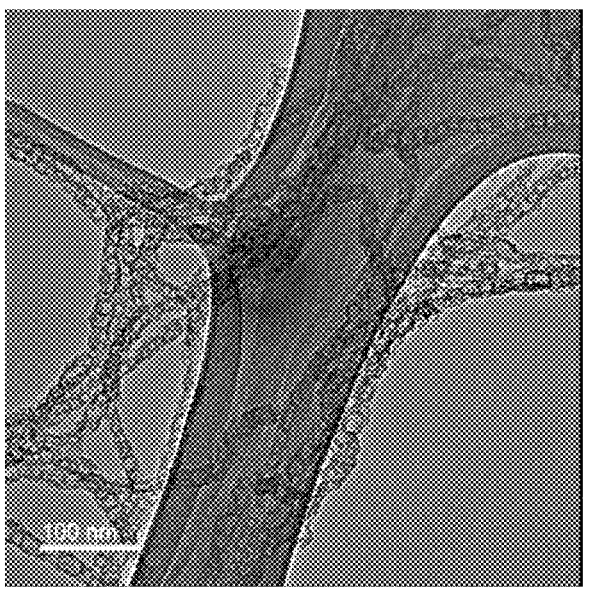
FIG. 19 shows a TEM image of the cup-stack carbon tubes.

Cup-stack carbon tubes (R6) were formed from the nano-sized CaO source when the water ratio was increased. The cup-stack carbon tubes were low in yield due to the high water ratio. TEM images shows the cup-stack carbon tubes and the sample has a small impurity of hollow carbon nanospheres (FIG. 19).

Figure 21A:
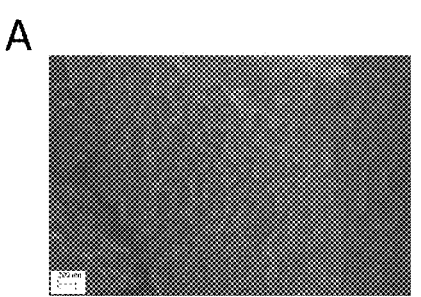
FIGS. 21A-21E show.
Figure 21B:
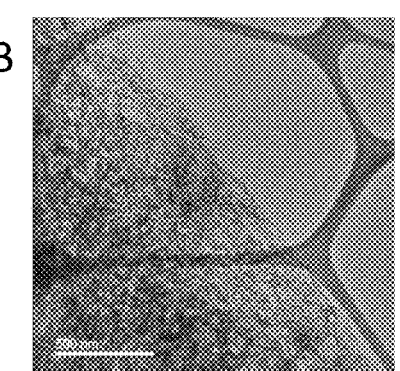
Figure 21C:
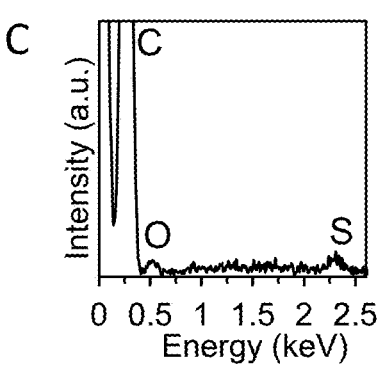
Figure 21D:
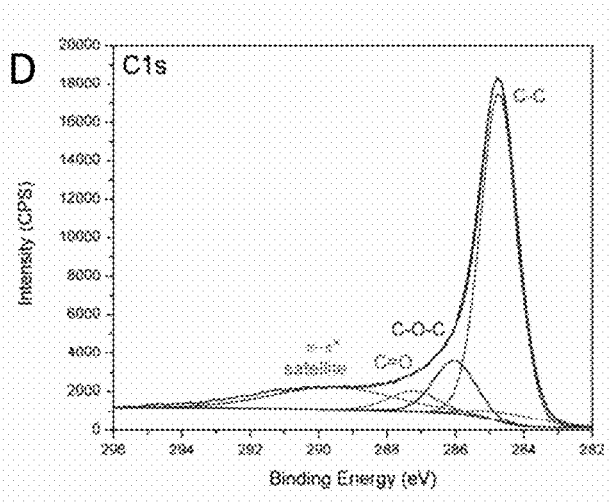
Figure 21E:
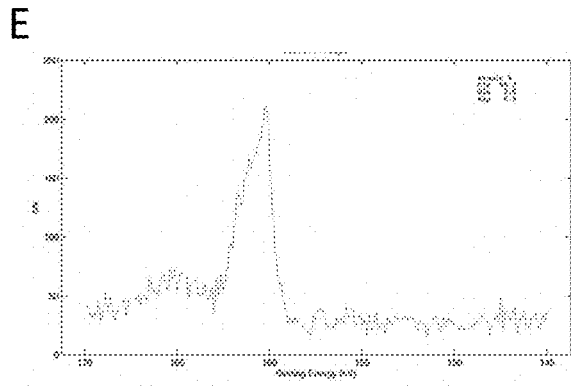

Similar to the $H_2O$ catalyst, hydrogen sulfide has a nearly identical structure. A reaction substituting $H_2O$ with the isostructural $H_2S$ (R8) produced sulfur-doped crumpled carbon Hydrogen sulfide has been used a as catalytically beneficial gas for the synthesis of zeolite templated carbons[32]. The SEM/TEM images shows the crumpled carbon after the removal of calcium (FIGS. 21A and 21B). The SEM-EDS indicates (95:4.75:0.25) C:O:S ratio in the crumpled carbon (FIG. 21C). The XPS elemental analysis indicated an atomic composition (96.3:3.0:0.6) C:O:S ratio (FIG. 21D). The S-2p XPS spectrum indicates a mixture of thiophene/aromatic thiols, and a small amount of oxidized $S—O_x$ (FIG. 21E).

Figure 22:
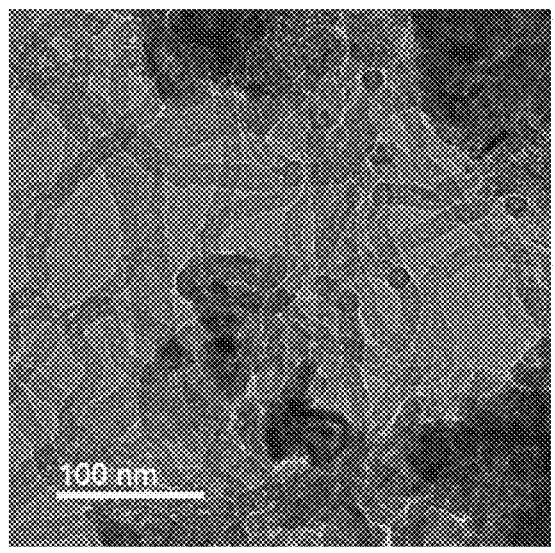
FIG. 22 is a TEM image of carbon nanotubes mixed with amorphous carbon.

The amorphous carbon and CNTs (R9) were synthesized at a low water ratio. The TEM image shows the hollow CNTs as well as the endon showing the ~3 nm pore diameter (FIG. 22). The CNTs were on average 14.2 nm in diameter measured by Image J.

Figure 23:
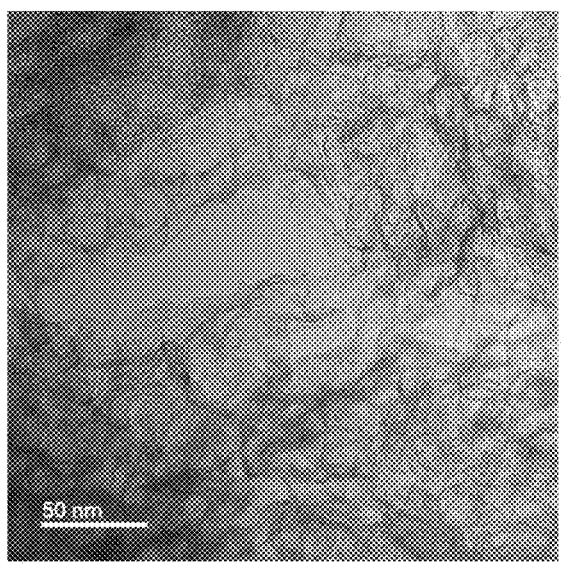
FIG. 23 shows TEM images of few-layered crumpled carbon with some amorphous carbon.

At a high acetylene ratio (R10) TEM images show a mixture of crumpled carbon and amorphous carbon formation (FIG. 23).

A calcium carbonate reaction was unsuccessful likely due to $CO_2$ gas formation etching the carbon. Once the calcium carbonate was converted to CaO the reaction occurred.

Figure 24:
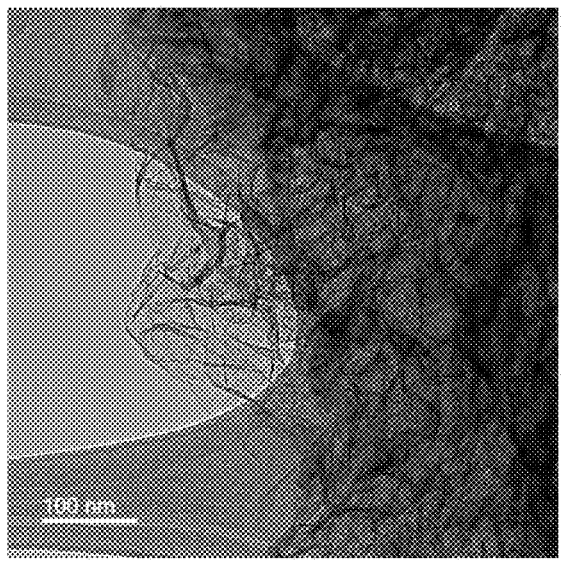
FIG. 24 is a TEM image of crumpled carbon produced from the 300 g scaled reaction.

A scaled reaction (R11) was performed in a tube furnace with quartz wool on the ends with 300 g of calcium hydroxide to show that the reaction can be easily scaled. The TEM image shows the crumpled carbon can be made in large quantities (FIG. 24). Also, the calcium hydroxide was recovered after calcium extraction and reused to show recyclability.

2. Porosity Analysis

Figures 10A, 10B:
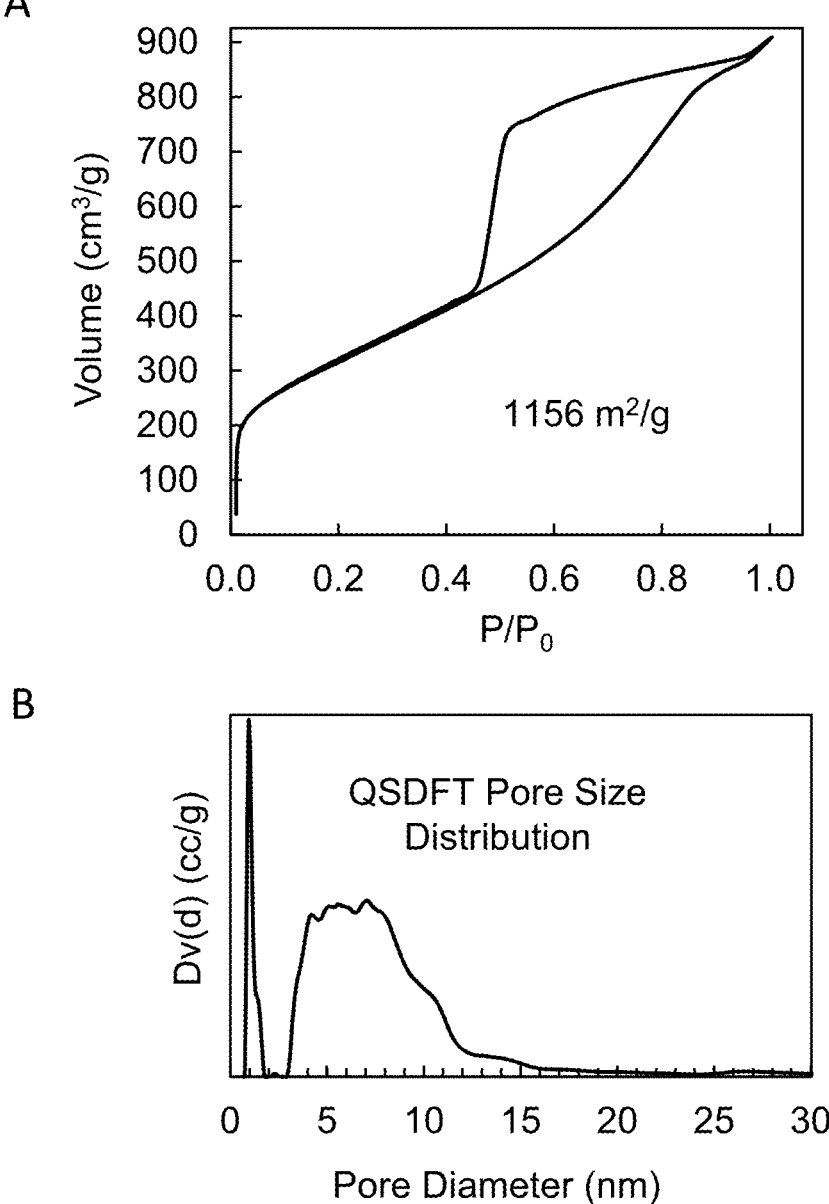
FIGS. 10A and 10B are graphs showing.
Figure 11:
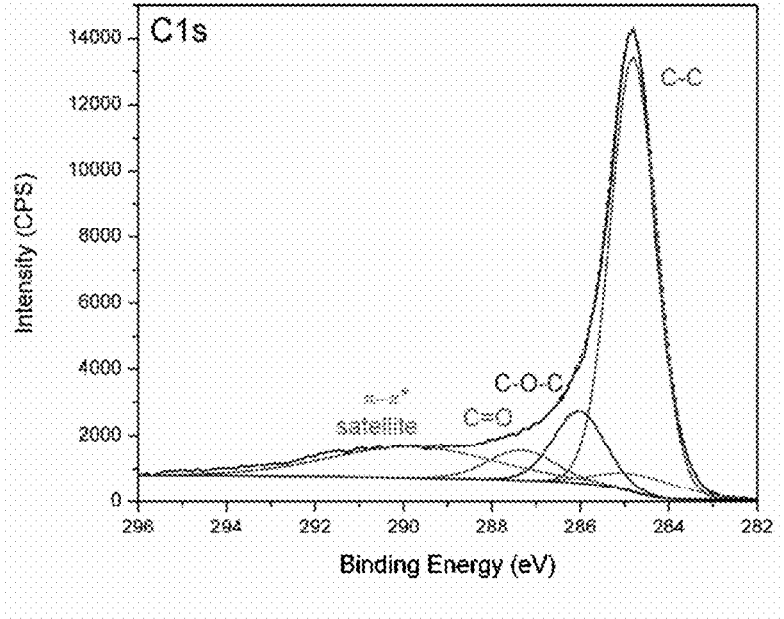
FIG. 11 is a graph showing the C1s XPS spectrum of crumpled carbon.
Figure 12A:
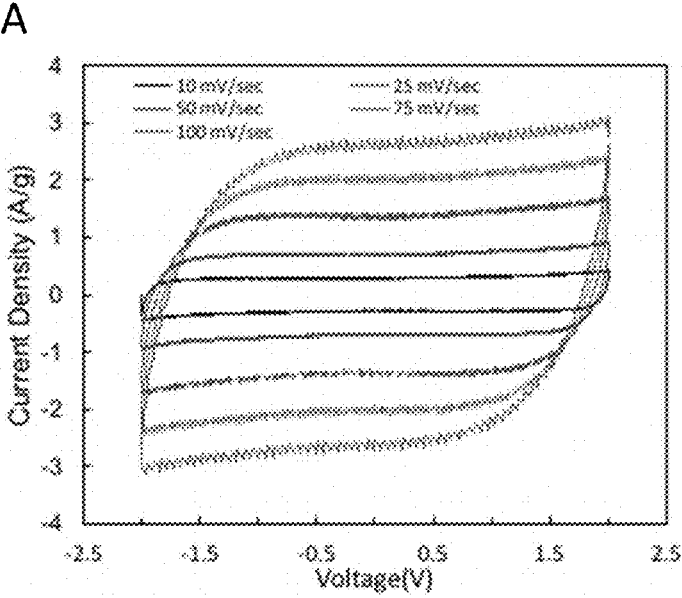
FIGS. 12A and 12B are graphs showing.
Figure 12B:
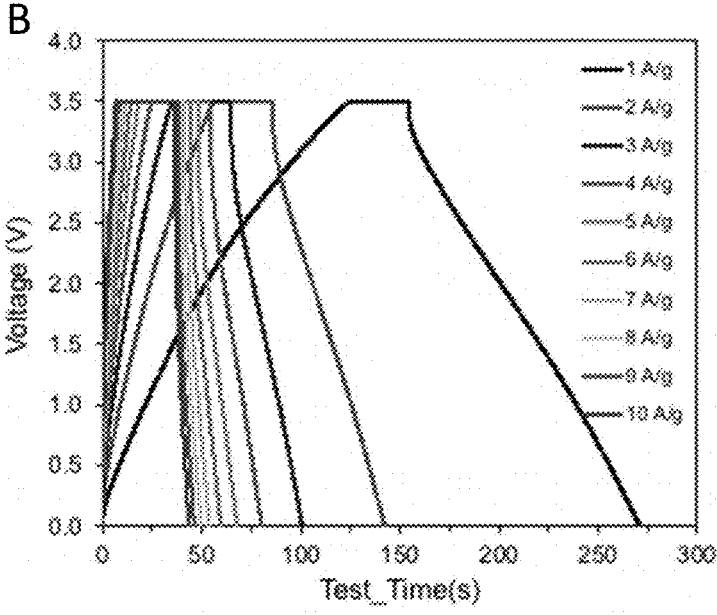
Figure 20B:
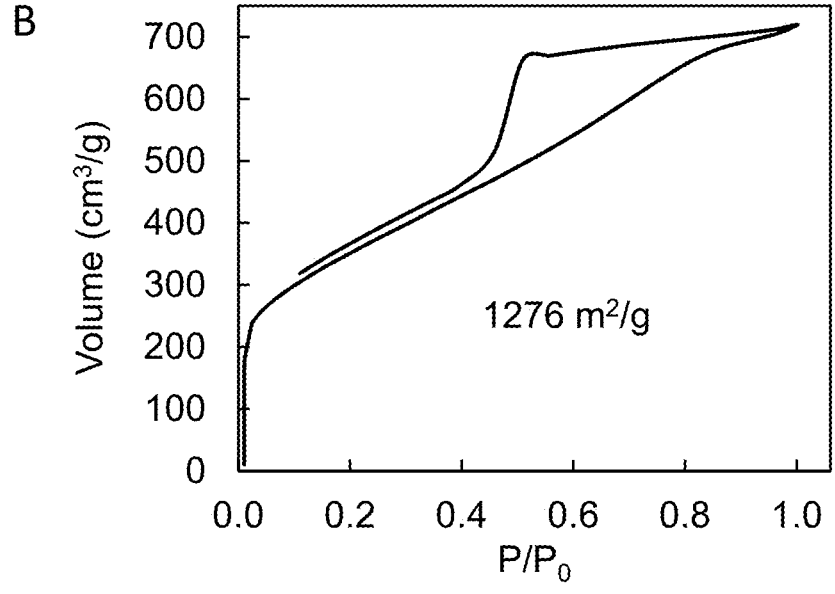
Figure 20C:
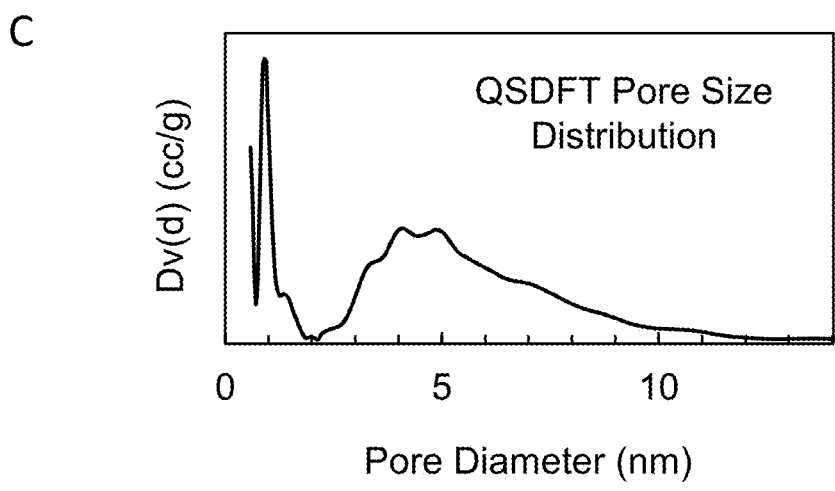

Surface area was measured on both the crumpled carbons and carbon nanospheres at several deposition times. The reactions with water (>2.0 mL/h) usually resulted in low yields (<3%) therefore surface areas were not measured. The multi-layer crumpled carbon (R2) resulted in a type IV with H3 hysteresis indicating the pore network is comprised of many mesopores that are incompletely filled by the nitrogen condensate (FIG. 15E)[38]. The surface area is 1063 $m^2/g$ with a 20 nm average pore size (FIG. 15F). Then, the crumpled/graphene fiber (R3) resulted in a surface area of 1156 $m^2/g$ with type IV isotherm and a H2(A) hysteresis curve (FIG. 10A). The strong H2(A) type hysteresis indicates strong pore-blocking cavitation. The pore size distribution showed a small contribution of micropores and a mesopore average size of ~7 nm (FIG. 10B). Furthermore, the few-layer crumpled carbon (R7) has a slightly increased surface area of 1276 $m^2/g$ likely from the short synthesis time (FIG. 20B). The carbon is a type IV with H2(A) hysteresis. The pores are composed of micropores and mesopores; where the average mesopore size is ~5 nm (FIG. 20C). Similar adsorption properties have been observed in rGO type IV with type H2(A) hysteresis[8, 39]. Comparable surface areas have been observed for lanthanum-catalyzed carbon growth[40-42]. Then the nano-calcium source was used to produce pore accessible and pore inaccessible hollow nanospheres by variation of the reaction time.

Figure 17B:
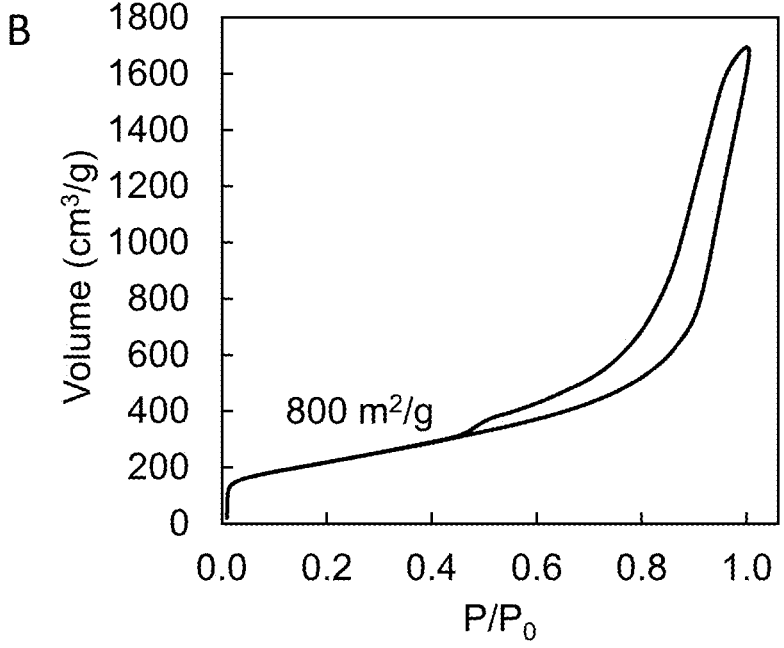
Figure 17C:
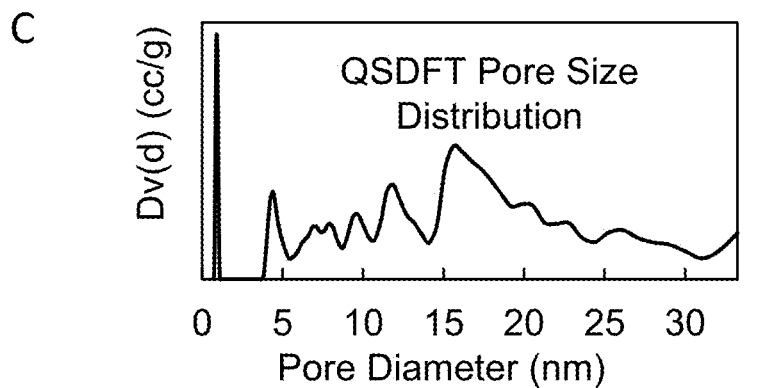

The few-layer carbon nanospheres (R4) have a surface area of 800 $m^2/g$ and average pore size of 16 nm (FIGS. 17B and 17C). The isotherm is type II with H3 hysteresis. The TEM shows open ended spheres such that structurally the interior and exterior are accessible to nitrogen gas (FIG. 17A). Carbon nanotubes only have external accessible surface area usually <500 $m^2/g$[43]. The increase in surface for a shorter time explains how longer deposition times add addition layers of carbon. Then the few-layer carbon nanospheres (R4) result in a surface area of 507 $m^2/g$ and average pore size of 17 nm (FIGS. 18D and 18E). The isotherm is type III with a very small hysteresis curve at $P/P_0>0.6$. The low surface area shows the interior is not accessible to nitrogen. The TEM shows how the hollow nanospheres have multiple layers of carbon (>15 layers) in most places, making it difficult to completely remove all the calcium from the core (FIG. 18C).

3. Electrical Conductivity

Lanthanum substituted zeolites (LaY) were previously used to as templates to form electrically conductive carbon with similar conductivity to a gold (111) surface[14]. The crumpled carbon was pressed into a thin sheet with 10% PTFE binder and the electrical conductivity of crumpled carbon was measured as $2.9 \times 10^5$ S/m. When compared to the conductivity of graphite in the basal plane the electrical conductivities is up to $2 \times 10^5$-$3 \times 10^5$ S/m[28]. When compared to reduced graphene (rGO) materials that have electrical resistivity the high end is near $3.0 \times 10^3$ S/m[44]. As seen in reported of carbon grown from LaY templates the Raman spectra and solid state NMR show that sp[2]-hybridized carbons are the primary carbon structure[14]. A well know material with both high surface area and electrical conductivity is Vulcan XC-72 has $5.0 \times 10^2$ S/m[28]. Another competitor carbon material is Printex XE-2 which has a conductivity of $1.2 \times 10^3$ S/m and surface area up to 1300 m$^2$/g[28].

Figure 16D:
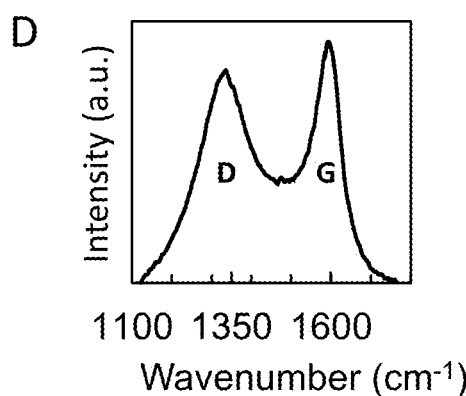

The Raman spectrum from the LaY molecular sieve templated carbon show that the D band is broad and composed of disordered 5 and 7 ring sp[2]-hybridized carbons[14]. The crumpled carbon Raman spectroscopy shows a comparable broad D band and an $I_D$:$I_G$ ratio of 0.89 (FIG. 16D). Authors Guo et al. show exceptional TEM examples of graphene defects such as the 5775 (Thrower-Stone-Wales)[45] and the 585 defect[46]. The temperature of carbon synthesis was varied, and it was found that 650° C. produced carbon with the most crystalline carbon based on Raman spectroscopy. The crumpled carbon had the lowest $I_D$:$I_G$ ratio and FWHM at 650° C. when reaction temperature was varied from 300° C. to 700° C. It has been reported that 650° C. is the best temperature for the formation graphitic carbon nanotube from acetylene because of the lower FWHM (less broad D and G bands) as well as an increased intensity G band[35].

Carbon-1s XPS was preformed to determine the relative ratio of C—C, C—O—C, and C=O bonding. FIG. 5 depicts the relative ratio of C—C, C—O—C, C=O, and satellite as 63.0%, 12.7%, 7.40%, and 16.9% respectively. The XPS study also indicates electrically conductive sp$^2$ carbons from the significant π-π* plasmon loss peak at 291.2 eV. The ratio between the C—C and π-π* plasmon loss peak is 1:0.27. X-ray photoelectron spectroscopy of crumpled carbon shows the C1s energy levels. The C—C peak likely represents mostly sp$^2$-hybridized carbon and the asymmetric shape is likely due C-sp$^2$ hybridization defects[47-48]. The strong π-π* satellite peak indicates a significantly delocalized π-bonding system[49]. The satellite peak arises when a core shell carbon is electron is ejected and then interacts with the delocalized π-system, thus resulting in a higher binding energy. In general terms, the π-π* satellite is a highest occupied molecular orbital (HOMO) to the lowest unoccupied molecular orbital (LUMO) transition in an aromatic carbon ring; initiated by an ejected carbon is photoelectron. The π-π* satellite peak at 291.2 eV, also known as a "shake-up" or "plasmon loss", arises specifically from the sp$^2$ hybridized carbon[48, 50]. The π-π* satellite peak is observed in highly electrically conductive carbons such as Vulcan XC-72 and Ketjenblack ED 600[51]. It has also been observed in thermal reduced graphene oxide[52]. This shake-up peak is also observed in thermally reduced graphene[52]. graphite[47], and many conductive carbon black materials[28]. The π-π* plasmon loss peak is likely enhanced in this material because carbon heterogeneity changes the electronic environment and leads to a broadened carbon XPS peaks[28]. XPS analysis found similar trends in (R5) multi-layer carbon nanospheres (FIG. 18F) and (R8) sulfur-doped crumpled carbon (FIGS. 21D and 21E).

4. Electrochemical Characterization

Figures 25A, 25B, 25C:
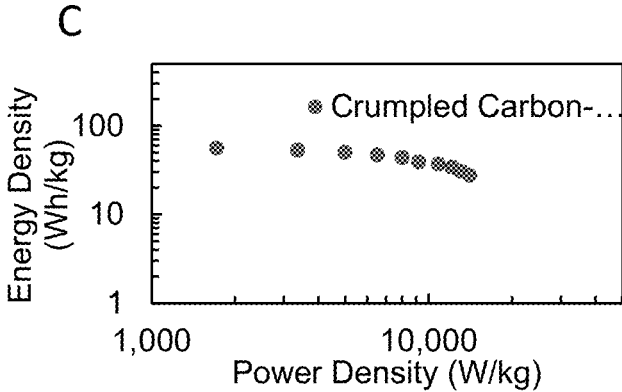
FIGS. 25A-25C show.

The crumpled carbon was prepared as the electrodes in a supercapacitor device using EMI-TFSI as the electrolyte. Coin cells were assembled using a previously established method[53-54]. The electrodes were 40 μm thick with 3% PTFE binder and a mass of 0.12950 g for both electrodes. FIG. 6a shows the cyclic voltammetry (CV) curves of crumpled carbon at (10, 25, 50, 75, and 100 mV/s from −2.0-2.0 V. The rectangular shape of the CV curve indicates a near ideal electrochemical double layer behavior. FIG. 25A shows the specific capacitances at the different scan rates. The capacitance (C) and specific capacitance (C$_{sp}$) of the supercapacitor cells were calculated from CV curves by equation 4 and equation 5.

$$C = \int I / \upsilon \, dt \qquad (4)(5)$$

$$C_{sp} = 4C/m \qquad (5)(6)$$

In the equations above I is the current, $\upsilon$ is the scan rate, m is the total mass of both electrodes.

At 10 mV/s the cell has a maximum specific capacitance of 118.6 F/g. A similar study utilizing lanthanum nanorod templated carbons has a comparable specific capacitance of 128 F/g[41]. FIG. 6b shows the galvanostatic charge-discharge curves for current densities of 1-10 A/g from 0-3.5 V. The voltage drop due to internal resistance (IR) drop is 0.05 V at 1 A/g which indicates that the carbons are highly electrically conductive. The power density (P) and energy density (E) were calculated at 1-10 A/g by equations (6) and (7)

$$E = \frac{1}{2} CV^2 \qquad (6)$$

$$P = E/t \qquad (7)$$

In the equations above, Vis the voltage window from 0-3.5 V subtracting the IR drop and t is the discharge time. FIG. 25 (b,c) shows the energy and power densities at 1-10 A/g and Ragone plot. Generally, the energy density has good retention of 27.5 Wh/kg at 14 kW/kg and charging at 10 A/g. The energy density of crumpled carbon at 1 A/g was 55.7 Wh/kg. Comparably, reduced graphene oxide (rGO) in ionic liquid has a specific energy density of 55 Wh/kg[22].

Conclusion

A method was developed for the generation of graphene-like carbons using calcium-based catalysts. Graphitic carbons as crumpled graphene, graphene fibers, hollow nanospheres, cup-stack tubes, and carbon nanotube morphologies were produced. The materials resulted in high surface area (>1,000 m$^2$/g) as well as high electrical conductivity (>10$^5$ S/m). It was shown that long reaction times results in more layers of carbon and that at high water concentrations (>2.0 mL/h) the carbon yield significantly decreases. Reactions also were carried out substituting H$_2$S for H$_2$O. Furthermore, a scaled synthesis using 300 g of calcium hydroxide was accomplished and then the extracted calcium hydroxide was recycled. Finally, the catalytic mechanism using calcium hydroxide for the production of graphitic carbons is explained.

The mechanistic origin of the XPS π-π* plasmon loss peak is explained for carbon materials. The XPS π-π* plasmon loss peak at 291.2 eV is an important indicator of electrically conductive carbon in a delocalized sp$^2$-carbon network. At 3.5 V, the crumpled carbon has an energy density of 55.7 Wh/kg at 1 A/g. The various morphologies combined with the high surface area and high electrical conductivity could be useful for energy storage as well as many other applications that use graphene-like carbons.

The exceptional properties combined with the low cost of materials and ease of scalability makes this material and method industrially relevant for mass production of graphene and carbon nanotube-type materials. Additionally, films of Calcium oxide on quartz and aluminum as well as MgO are being investigated for the generation of electrically conductive carbons. The electrically conductive crumpled carbon will likely be an excellent composite material for pseudocapacitive metal oxides for use in EDLCs. Other elements, e.g., Li, Mg, Sc, Y, and metal ions thereof, can also catalytically form carbons. Many other carbon nanostructures can be formed using this technique.

References in Example 2

1. Ahn, A N. Things you could do with graphene. *Nature Nanotechnology* 2014, 9 (10), 737-737.
2. Aditya, D. G.; Abhay, R. S.; Vilasrao, J. K., Graphene: A Comprehensive Review. *Current Drug Targets* 2017, 18 (6), 724-733.
3. Ford to integrate graphene-enhanced parts into its vehicles https://www.compositesworld.com/articles/ford-to-integrate-graphene-enhanced-parts-into-its-vehicles. (accessed Jan. 10, 2020).
4. Dimov, D.; Amit, I.; Gorrie, O.; Barnes, M. D.; Townsend, N. J.; Neves, A. I. S.; Withers, F.; Russo, S.; Craciun, M. F., Ultrahigh Performance Nanoengineered Graphene-Concrete Composites for Multifunctional Applications. *Adv. Funct. Mater.* 2018, 28 (23), 1705183.
5. Pumera, M., Graphene-based nanomaterials for energy storage. *Energy & Environmental Science* 2011, 4 (3), 668-674.
6. Lin, L.; Peng, H.; Liu, Z., Synthesis challenges for graphene industry. *Nat. Mater.* 2019, 18 (6), 520-524.
7. Son, I. H.; Park, J. H.; Park, S.; Park, K.; Han, S.; Shin, J.; Doo, S.-G.; Hwang, Y.; Chang, H.; Choi, J. W., Graphene balls for lithium rechargeable batteries with fast charging and high volumetric energy densities. *Nat. Commun.* 2017, 8 (1), 1561.
8. Liu, C.; Yu, Z.; Neff, D.; Zhamu, A.; Jang, B. Z., Graphene-Based Supercapacitor with an Ultrahigh Energy Density. *Nano Lett.* 2010, 10 (12), 4863-4868.
9. Yassine, M.; Fabris, D., Performance of Commercially Available Supercapacitors. *Energies* 2017, 10 (9), 1340.
10. Dorner-Reisel, A.; Schürer, C.; Klemm, V.; Irmer, G.; Müller, E., Nano- and microstructure of diamond-like carbon films modified by Ca—O incorporation. *Diamond Relat. Mater.* 2003, 12 (3), 1030-1033.
11. Zhao, J.; Guo, Y.; Li, Z.; Guo, Q.; Shi, J.; Wang, L.; Fan, J., An approach for synthesizing graphene with calcium carbonate and magnesium. *Carbon* 2012, 50 (13), 4939-4944.
12. Zhang, M.; Chen, K.; Wang, C.; Jian, M.; Yin, Z.; Liu, Z.; Hong, G.; Liu, Z.; Zhang, Y., Mineral-Templated 3D Graphene Architectures for Energy-Efficient Electrodes. *Small* 2018, 14 (22), 1801009.
13. Kim, K.; Kwon, Y.; Lee, T.; Cho, S. J.; Ryoo, R., Facile large-scale synthesis of three-dimensional graphene-like ordered microporous carbon via ethylene carbonization in CaX zeolite template. *Carbon* 2017, 118, 517-523.
14. Lee, H.; Kim, K.; Kang, S.-H.; Kwon, Y.; Kim, J. H.; Kwon, Y.-K.; Ryoo, R.; Park, J. Y., Extremely high electrical conductance of microporous 3D graphene-like zeolite-templated carbon framework. *Sci. Rep.* 2017, 7, 11460.
15. Han, G.-F.; Chen, Z.-W.; Jeon, J.-P.; Kim, S.-J.; Noh, H.-J.; Shi, X.-M.; Li, F.; Jiang, Q.; Baek, J.-B., Low-Temperature Conversion of Alcohols into Bulky Nanoporous Graphene and Pure Hydrogen with Robust Selectivity on CaO. *Adv. Mater.* 2019, 31 (16), 1807267.
16. Caropreso, F. E., Some Novel Reactions of Calcium Carbide. *PhD Thesis, Seton Hall University* 1969.
17. Jia, Y.; Chen, X.; Zhang, G.; Wang, L.; Hu, C.; Sun, X., Topotactic conversion of calcium carbide to highly crystalline few-layer graphene in water. *Journal of Materials Chemistry* A 2018, 6 (46), 23638-23643.
18. Brown, B.; Swain, B.; Hiltwine, J.; Brooks, D. B.; Zhou, Z., Carbon nanosheet buckypaper: A graphene-carbon nanotube hybrid material for enhanced supercapacitor performance. *J. Power Sources* 2014, 272, 979-986.
19. Gor, G. Y.; Thommes, M.; Cychosz, K. A.; Neimark, A. V., Quenched solid density functional theory method for characterization of mesoporous carbons by nitrogen adsorption. *Carbon* 2012, 50 (4), 1583-1590.
20. Neimark, A. V.; Lin, Y.; Ravikovitch, P. I.; Thommes, M., Quenched solid density functional theory and pore size analysis of micro-mesoporous carbons. *Carbon* 2009, 47 (7), 1617-1628.
21. Pomerantseva, E.; Bonaccorso, F.; Feng, X.; Cui, Y.; Gogotsi, Y., Energy storage: The future enabled by nanomaterials. *Science* 2019, 366 (6468), eaan8285.
22. Shao, Q.; Tang, J.; Lin, Y.; Li, J.; Qin, F.; Zhang, K.; Yuan, J.; Qin, L.-C., Ionic liquid modified graphene for supercapacitors with high rate capability. *Electrochim. Acta* 2015, 176, 1441-1446.
23. Vivekchand, S. R. C.; Rout, C. S.; Subrahmanyam, K. S.; Govindaraj, A.; Rao, C. N. R., Graphene-based electrochemical supercapacitors. *Journal of Chemical Sciences* 2008, 120 (1), 9-13.
24. Li, J.; Östling, M., Prevention of Graphene Restacking for Performance Boost of Supercapacitors—A Review. *Crystals* 2013, 3 (1).
25. Bondavalli, P., 3-Graphene Supercapacitors: When Material Drives Innovation. In *Graphene and Related Nanomaterials*, Bondavalli, P., Ed. Elsevier: 2018; pp 71-102.
26. Lavin-Lopez, M. d. P.; Romero, A.; Garrido, J.; Sanchez-Silva, L.; Valverde, J. L., Influence of Different Improved Hummers Method Modifications on the Characteristics of Graphite Oxide in Order to Make a More Easily Scalable Method. *Industrial & Engineering Chemistry Research* 2016, 55 (50), 12836-12847.
27. Morimoto, N.; Kubo, T.; Nishina, Y., Tailoring the Oxygen Content of Graphite and Reduced Graphene Oxide for Specific Applications. *Sci. Rep.* 2016, 6 (1), 21715.
28. Pantea, D.; Darmstadt, H.; Kaliaguine, S.; Roy, C., Electrical conductivity of conductive carbon blacks: influence of surface chemistry and topology. *Appl. Surf Sci.* 2003, 217 (1), 181-193.
29. Luo, J.; Jang, H. D.; Sun, T.; Xiao, L.; He, Z.; Katsoulidis, A. P.; Kanatzidis, M. G.; Gibson, J. M.; Huang, J., Compression and Aggregation-Resistant Particles of Crumpled Soft Sheets. *ACS Nano* 2011, 5 (11), 8943-8949.
30. Xu, Z.; Gao, C., Graphene chiral liquid crystals and macroscopic assembled fibres. *Nat. Commun.* 2011, 2 (1), 571.

31. Xu, Z.; Gao, C., Graphene fiber: a new trend in carbon fibers. *Mater. Today* 2015, 18 (9), 480-492.

32. Choi, C. H.; Kim, M.; Kwon, H. C.; Cho, S. J.; Yun, S.; Kim, H.-T.; Mayrhofer, K. J. J.; Kim, H.; Choi, M., Tuning selectivity of electrochemical reactions by atomically dispersed platinum catalyst. *Nat. Commun.* 2016, 7 (1), 10922.

33. The Industrial Uses of Calcium Carbide and Acetylene. *Journal of Industrial & Engineering Chemistry* 1913, 5 (7), 606-606.

34. Schobert, H., Production of Acetylene and Acetylene-based Chemicals from Coal. *Chem. Rev.* 2014, 114 (3), 1743-1760.

35. Klinke, C.; Kurt, R.; Bonard, J.-M.; Kern, K., Raman Spectroscopy and Field Emission Measurements on Catalytically Grown Carbon Nanotubes. *J. Phys. Chem. B* 2002, 106 (43), 11191-11195.

36. Ko, S. H.; Lee, T.; Park, H.; Ahn, D.-S.; Kim, K.; Kwon, Y.; Cho, S. J.; Ryoo, R., Nanocage-Confined Synthesis of Fluorescent Polycyclic Aromatic Hydrocarbons in Zeolite. *JACS* 2018, 140 (23), 7101-7107.

37. Jang, S. B.; Jeong, M. S.; Kim, Y.; Seff, K., Crystal Structures of the Ethylene and Acetylene Sorption Complexes of Fully Ca2+-Exchanged Zeolite X. *J Phys. Chem. B* 1997, 101 (16), 3091-3096.

38. Thommes, M.; Kaneko, K.; Neimark, A. V.; Olivier, J. P.; Rodriguez-Reinoso, F.; Rouquerol, J.; Sing, K. S. W., Physisorption of gases, with special reference to the evaluation of surface area and pore size distribution (IUPAC Technical Report). *Pure Appl. Chem.* 2015, 87 (9-10).

39. Zhou, X.; Wang, M.; Lian, J.; Lian, Y., Supercapacitors based on high-surface-area graphene. *Science China Technological Sciences* 2014, 57 (2), 278-283.

40. Brown, A. T.; Thomas, M. C.; Chabal, Y. J.; Balkus, K. J., Nanocast carbon microsphere flowers from a lanthanum-based template. *Mater. Lett.* 2019, 234, 224-227.

41. Wang, Z.; Perera, W. A.; Perananthan, S.; Ferraris, J. P.; Balkus, K. J., Lanthanum Hydroxide Nanorod-Templated Graphitic Hollow Carbon Nanorods for Supercapacitors. *ACS Omega* 2018, 3 (10), 13913-13918.

42. Wang, Z.; Perananthan, S.; Panangala, S. D.; Ferraris, J. P.; Balkus, K. J., Wrinkled mesoporous silica supported lanthanum oxide as a template for porous carbon. *J. Nanosci. Nanotechnol* 2018, 18 (1), 414-418.

43. Zhang, L. L.; Zhao, X. S., Carbon-based materials as supercapacitor electrodes. *Chem. Soc. Rev.* 2009, 38 (9), 2520-2531.

44. Chen, Y.; Fu, K.; Zhu, S.; Luo, W.; Wang, Y.; Li, Y.; Hitz, E.; Yao, Y.; Dai, J.; Wan, J.; Danner, V. A.; Li, T.; Hu, L., Reduced Graphene Oxide Films with Ultrahigh Conductivity as Li-Ion Battery Current Collectors. *Nano Lett.* 2016, 16 (6), 3616-3623.

45. Li, H.; Zhang, H.-x.; Yan, X.-1.; Xu, B.-s.; Guo, J.-j., Carbon-supported metal single atom catalysts. *New Carbon Materials* 2018, 33 (1), 1-11.

46. Araujo, P. T.; Terrones, M.; Dresselhaus, M. S., Defects and impurities in graphene-like materials. *Mater. Today* 2012, 15 (3), 98-109.

47. Estrade-Szwarckopf, H., XPS photoemission in carbonaceous materials: A "defect" peak beside the graphitic asymmetric peak. *Carbon* 2004, 42 (8), 1713-1721.

48. Kaliaguine, S., Application of surface science techniques in the field of zeolitic materials. In *Stud. Surf. Sci. Catal.*, Chon, H.; Woo, S. I.; Park, S. E., Eds. Elsevier: 1996; Vol. 102, pp 191-230.

49. Kelemen, S. R.; Rose, K. D.; Kwiatek, P. J., Carbon aromaticity based on XPS II to II* signal intensity. *Appl. Surf Sci.* 1993, 64 (2), 167-174.

50. Yang, D.-Q.; Sacher, E., Carbon is X-ray Photoemission Line Shape Analysis of Highly Oriented Pyrolytic Graphite: The Influence of Structural Damage on Peak Asymmetry. *Langmuir* 2006, 22 (3), 860-862.

51. Bevilacqua, M.; Bianchini, C.; Marchionni, A.; Filippi, J.; Lavacchi, A.; Miller, H.; Oberhauser, W.; Vizza, F.; Granozzi, G.; Artiglia, L.; Annen, S. P.; Krumeich, F.; Grützmacher, H., Improvement in the efficiency of an OrganoMetallic Fuel Cell by tuning the molecular architecture of the anode electrocatalyst and the nature of the carbon support. *Energy Environ. Sci.* 2012, 5 (9), 8608-8620.

52. Jin, M.; Jeong, H.-K.; Kim, T.-H.; So, K. P.; Cui, Y.; Yu, W. J.; Ra, E. J.; Lee, Y. H., Synthesis and systematic characterization of functionalized graphene sheets generated by thermal exfoliation at low temperature. *J. Phys. D: Appl. Phys.* 2010, 43 (27), 275402.

53. Perera, S. D.; Mariano, R. G.; Nijem, N.; Chabal, Y.; Ferraris, J. P.; Balkus, K. J., Alkaline deoxygenated graphene oxide for supercapacitor applications: An effective green alternative for chemically reduced graphene. *J. Power Sources* 2012, 215 (Supplement C), 1-10.

54. Panangala, S. D.; Karunaweera, C.; Jayawickramage, R.; Balkus, K. J.; Ferraris, J. P., Aromatic Polyimides Containing Diaminobenzoic Acid as in Situ Porogen for Electrochemical Supercapacitors. *ACS Applied Polymer Materials* 2019, 1 (11), 3203-3209.

Example 3

Synthesis of Continuous Conductive Carbon Sheets Using a Magnesium-Based Catalyst The synthesis of continuous conductive carbon sheets is as follows: Magnesium ribbon, Mg/Al alloy (95/5), and magnesium foil were used as a catalysts for the growth of continuous and conductive carbon sheets. Typically, a gas flow of acetylene, nitrogen, and steam are passed over the magnesium ribbon at 650° C. to form the carbon. During synthesis, the surface of magnesium ribbon is first converted to magnesium oxide. A magnesium acetylide intermediate is formed and then steam reacts with magnesium acetylide and forms a carbon layer. The resulting carbon is a continuous sheet and highly electrically conductive.

Referring to FIG. 26, a flow chart for synthesis of continuous conductive carbon sheets is outlined. According to synthesis method 2600 continuous conductive carbon sheet structures are synthesized from a variety of sources including magnesium ribbon, Mg:Al alloy (95:5), and magnesium foil. At step 2602, the magnesium source is placed in a tube furnace under constant nitrogen flow, after which the tube furnace is heated to reaction temperature (step 2604). Typically, the reaction temperature is about 650° C. with a heating time of about 5° C./min (see, e.g., FIG. 13), however, in other embodiments reaction temperature may be in the range from 400° C. to 700° C. for a particular calcium source and a desired morphology. At step 2606, acetylene flow and water (steam) flow into the furnace are initiated to accomplish carbon deposition onto the calcium source. The carbon deposition continues for an allotted time which may be varied from 0.3 h up to 5 h and then stopped. The water content may be varied from about 1.75 mL/min-2.5 mL/min. The acetylene content may be varied from about 15 cc/min to 70 cc/min. Typically, the synthesis method 2600 may use 30 mL/min acetylene, 200 mL/min nitrogen and 2 mL/h water for 1.5 h (FIG. 13).

At step 2608, after acetylene flow and water flow are stopped, the reaction is annealed at 900° C. for graphitization. At step 2610 the furnace is turned off and the resulting product removed. At step 2612, the resulting product is then rinsed with water and subsequently dried (step 2614). Drying is accomplished, for example, at about 100° C. or similar temperature.

Continuous carbon sheets can be rolled into long carbon wires. Carbon wires have practical applicability in various textiles due to their lightweight nature, mechanical strength, and high electrical conductivity. A major direction in modern electronics is the development of electrically conductive carbon wires. The carbon wire industry currently has some electrically conductive materials: Carbon nanotube fibers (up to $10^3$ S/m), reduced graphene oxide fibers (up to $10^2$ S/m), and polyacrylonitrile-based carbon fibers. The electrical conductivity of magnesium catalyzed continuous carbon sheet is >$10^5$ S/m. Major issues exist for carbon nanotubes and reduced graphene fibers because those materials tend to be aggregates of smaller fibers with short lengths (<10 μm), therefore intrinsically have low electrical conductivity. Optimally, this method will produce a continuous sheet of carbon, several kilometers in length.

Another method to producing continuous carbon sheets is as follows. Magnesium oxide could be deposited on thin films on aluminum foil and then carbon can be deposited on the surface. The thin film of magnesium oxide on aluminum foil could be used as a roll-to roll method for producing continuous carbon films.

Furthermore, these are other popular applications of conductive carbons. The carbons can be used as insulating shields for power cables to dissipate electrical charge. The carbons can also be the antistatic component encased in a polymer to protect electronic devices from electrostatic discharge.

Continuous carbon sheets can be rolled into long carbon fiber wires. Carbon wires have practical applicability in various textiles due to their lightweight nature, mechanical strength, and high electrical conductivity.

Figure 27:
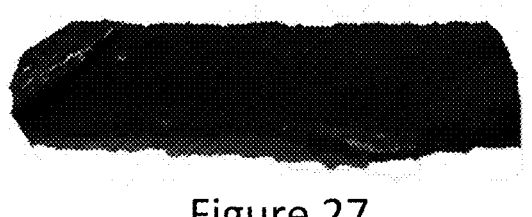
FIG. 27 shows a digital image of magnesium ribbon coated in carbon.
Figure 28:
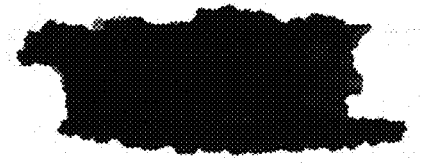
FIG. 28 shows a digital image of carbon after removal of magnesium using hydrochloric acid.
Figures 29A, 29B:
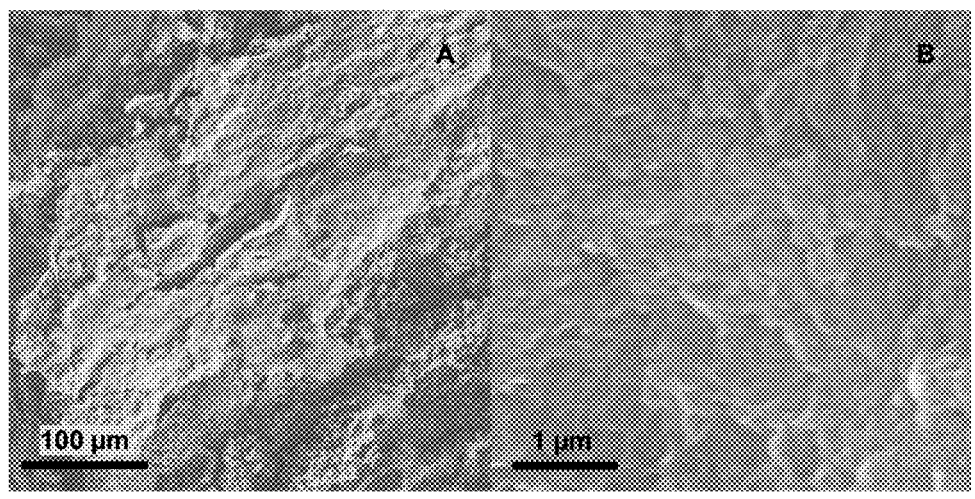
FIGS. 29A and 29B show SEM images of the carbon after magnesium was removed using hydrochloric acid.
Figure 30:
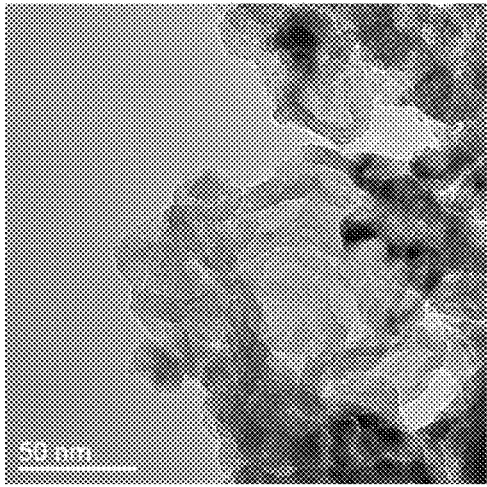
FIG. 30 shows a TEM image of the carbon after magnesium was removed using hydrochloric acid.

Exemplary product carbons prepared using magnesium ribbon as a catalyst before and after removal of the catalyst and support are shown in FIGS. 27 and 28, respectively. Further images of the product carbons after removal of the magnesium catalyst and support are shown in the SEM images depicted in FIGS. 29A and 29B, and the TEM image depicted in FIG. 30.

While specific embodiments of the present inventive concept have been shown and described, it will be understood that other modifications, substitutions and alternatives are apparent to one of ordinary skill in the art. Such modifications, substitutions and alternatives can be made without departing from the spirit and scope of the inventive concept, which should be determined from the appended claims.

That which is claimed is:

1. A method of preparing a nanocarbon material comprising:

heating a template to a first temperature, the template consists of a catalyst;

wherein the catalyst comprises lanthanum carbonate hydroxide, lanthanum carbonate oxide, or a mixed phase of lanthanum carbonate hydroxide and lanthanum carbonate oxide;

exposing the template to a carbon source at the first temperature for a first period of time;

annealing the template and carbon derived from the carbon source at a second temperature for a second period of time; and removing the template to provide a nanocarbon material having an electrical conductivity greater than about 103 S/m and a surface area greater than about 500 m²/g.

2. The method of claim 1, wherein the nanocarbon material comprises greater than about 95% carbon.

3. The method of claim 1, wherein the first temperature is in a range of about 400-700° C.

4. The method of claim 1, wherein the second temperature is about 900° C.

5. The method of claim 1, wherein the carbon source comprises acetylene.

6. The method of claim 1, wherein the carbon source is exposed to the template in a presence of a flow of steam/water vapor.

7. The method of claim 1, wherein the method is conducted under a substantially constant flow of nitrogen.

8. The method of claim 1, wherein the nanocarbon material is a microsphere flower.

9. The method of claim 1, wherein the catalyst consists of lanthanum carbonate hydroxide, lanthanum carbonate oxide, or a mixed phase of lanthanum carbonate hydroxide and lanthanum carbonate oxide.

* * * * *